United States Patent
Oh et al.

(10) Patent No.: US 10,027,996 B2
(45) Date of Patent: Jul. 17, 2018

(54) METHOD AND DEVICE FOR TRANSMITTING AND RECEIVING BROADCAST SIGNAL ON BASIS OF COLOR GAMUT RESAMPLING

(71) Applicant: LG ELECTRONICS INC., Seoul (KR)

(72) Inventors: Hyunmook Oh, Seoul (KR); Jongyeul Suh, Seoul (KR); Soojin Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 21 days.

(21) Appl. No.: 15/109,587

(22) PCT Filed: Jan. 5, 2015

(86) PCT No.: PCT/KR2015/000068
§ 371 (c)(1),
(2) Date: Jul. 1, 2016

(87) PCT Pub. No.: WO2015/102449
PCT Pub. Date: Jul. 9, 2015

(65) Prior Publication Data
US 2017/0048561 A1    Feb. 16, 2017

Related U.S. Application Data

(60) Provisional application No. 61/923,773, filed on Jan. 6, 2014.

(51) Int. Cl.
*H04N 21/2343* (2011.01)
*H04N 21/23* (2011.01)
(Continued)

(52) U.S. Cl.
CPC .......... *H04N 21/2343* (2013.01); *G09G 5/06* (2013.01); *H04N 19/186* (2014.11); *H04N 19/59* (2014.11);
(Continued)

(58) Field of Classification Search
None
See application file for complete search history.

(56) References Cited

U.S. PATENT DOCUMENTS

2007/0052986 A1*  3/2007  Spaulding ............ H04N 1/6058
                                                            358/1.9
2009/0086170 A1*  4/2009  El-Ghoroury .......... B82Y 20/00
                                                            353/38
(Continued)

FOREIGN PATENT DOCUMENTS

JP      2008136025 A      6/2008
JP      2008211468 A      9/2008
(Continued)

*Primary Examiner* — Justin Shepard
(74) *Attorney, Agent, or Firm* — Dentons US LLP

(57) ABSTRACT

The present invention relates to provision of a method and/or a device for transmitting and receiving a broadcast signal on the basis of color gamut resampling. The method for transmitting a broadcast signal, according to one embodiment of the present invention, comprises the steps of; resampling first color gamut-based content data into second color gamut-based content data; generating signaling information which includes color gamut resampling information indicating information on the resampling; respectively.

16 Claims, 17 Drawing Sheets

(51) Int. Cl.
  *H04N 19/70* (2014.01)
  *H04N 19/186* (2014.01)
  *H04N 19/85* (2014.01)
  *H04N 19/59* (2014.01)
  *G09G 5/06* (2006.01)
  *H04N 21/236* (2011.01)
  *H04N 21/81* (2011.01)

(52) U.S. Cl.
  CPC ............ *H04N 19/70* (2014.11); *H04N 19/85* (2014.11); *H04N 21/23* (2013.01); *H04N 21/236* (2013.01); *H04N 21/816* (2013.01); *G09G 2340/06* (2013.01)

(56) References Cited

U.S. PATENT DOCUMENTS

| | | | |
|---|---|---|---|
| 2009/0288125 A1* | 11/2009 | Morioka | H04N 7/1675 725/110 |
| 2010/0220237 A1 | 9/2010 | Doser et al. | |
| 2011/0128438 A1* | 6/2011 | Yamashita | G06T 1/00 348/384.1 |
| 2012/0026405 A1 | 2/2012 | Atkins et al. | |
| 2012/0163717 A1* | 6/2012 | Cho | H04N 1/603 382/167 |
| 2013/0194321 A1 | 8/2013 | Wan et al. | |
| 2013/0335439 A1 | 12/2013 | Jeong et al. | |

FOREIGN PATENT DOCUMENTS

| | | |
|---|---|---|
| JP | 2013-543290 A | 11/2013 |
| KR | 20090088890 A | 8/2009 |
| KR | 10-2009-0122368 A | 11/2009 |
| KR | 20100092693 A | 8/2010 |
| KR | 20130096970 A | 9/2013 |
| KR | 10-2013-0107314 A | 10/2013 |
| WO | 2007010779 A1 | 1/2007 |
| WO | 2010004726 A1 | 12/2011 |
| WO | 2013085245 A1 | 6/2013 |
| WO | 2014002324 A1 | 1/2014 |

* cited by examiner

FIG. 2
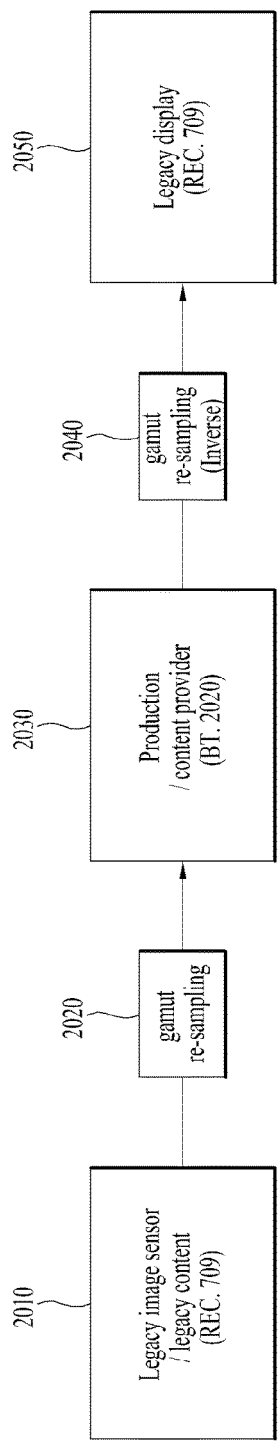
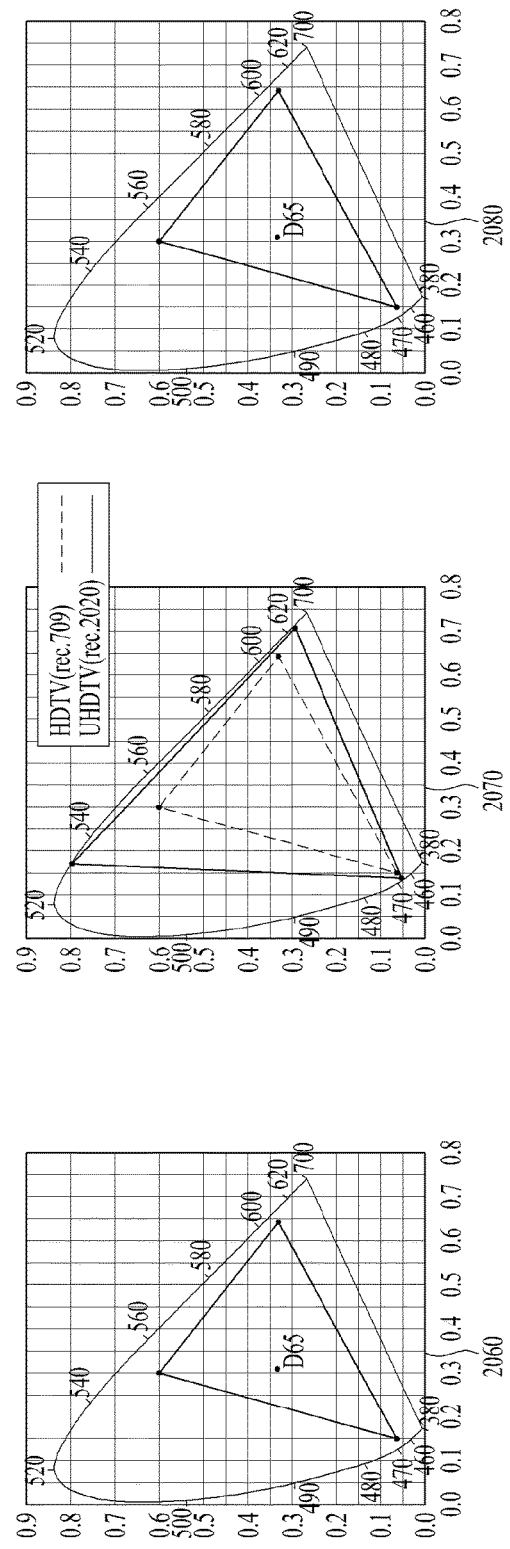

FIG. 5

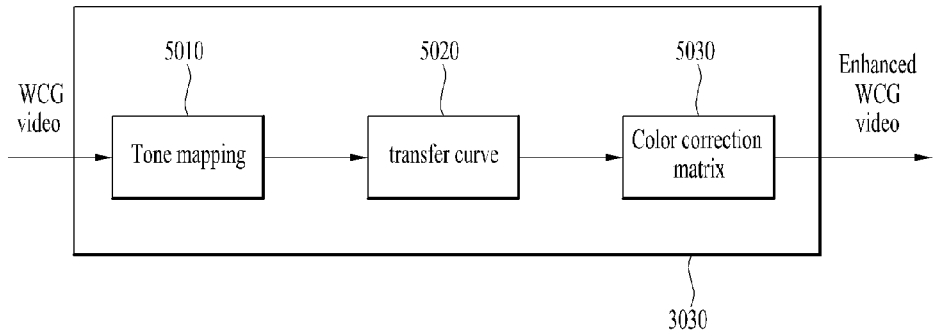

FIG. 6

| Syntax | Category | Descriptor |
|---|---|---|
| SEI_payload( payloadType , payloadSize ) { | | |
| ... | | |
| if( payloadType == 54 ) | | |
| Gamut_resampling_info (payloadSize) | 5 | |

FIG. 7

| Syntax | No. of bits | Format |
|---|---|---|
| Gamut_resampling_info(payloadSize) { | | |
|     Container_color_gamut_type | 4 | uimsbf |
|     Content_color_gamut_type | 4 | uimsbf |
|     if(Container_color_gamut_type=='0110'){ | | |
|         General_color_primaries ( ) | | |
|     } | | |
|     if(Content_color_gamut_type=='0110'){ | | |
|         General_color_primaries ( ) | | |
|     } | | |
|     reserved | 4 | uimsbf |
|     Gamut_resampling_type | 4 | uimsbf |
|     Gamut_resampling_info( ) | | |
| } | | |

FIG. 8

| Syntax | No. of bits | Format |
|---|---|---|
| General_color_primaries( ) { | | |
|     RGBW_primary_flag | 1 | uimsbf |
|     reserved | 7 | uimsbf |
|     if(RGBW_primary_flag=='1') { | | |
|         color_primary_r_x | 8 | uimsbf |
|         color_primary_r_y | 8 | uimsbf |
|         color_primary_g_x | 8 | uimsbf |
|         color_primary_g_y | 8 | uimsbf |
|         color_primary_b_x | 8 | uimsbf |
|         color_primary_b_y | 8 | uimsbf |
|     } | | |
|     else { | | |
|         color_primary_numbers_minus_3 | 4 | uimsbf |
|         reserved | 4 | uimsbf |
|         for(i=0; i<=color_primary_numbers_minus_3+3;i++) { | | |
|             color_primary_x[i] | 8 | uimsbf |
|             color_primary_y[i] | 8 | uimsbf |
|         } | | |
|     } | | |
|     white_primary_x | 8 | uimsbf |
|     white_primary_y | 8 | uimsbf |
| } | | |

FIG. 9

| Syntax | No. of bits | Format |
|---|---|---|
| gamut_resampling_info( ) { | | |
|   if (gamut_resampling_type= ='0001'){ | | |
|     color_space_type | 4 | uimsbf |
|     RGB_to_XYZ_mapping_function_flag | 1 | uimsbf |
|     XYZ_to_RGBprime_mapping_function_flag | 1 | uimsbf |
|     reserved | 2 | uimsbf |
|     if(RGB_to_XYZ_mapping_function_flag== 1 ){ | | |
|       reserved | 3 | uimsbf |
|       number_of_coeff | 5 | uimsbf |
|       for(i=0; i<number_of_coeff; i++) | | |
|         RGB_XYZ_mapping_function_coeff[i] | | |
|     } | | |
|     if(XYZ_to_RGBprime_mapping_function_flag == 1){ | | |
|       reserved | 3 | uimsbf |
|       number_of_coeff | 5 | uimsbf |
|       for(i=0; i<number_of_coeff; i++) | | |
|         XYZ_to_RGBprime_mapping_function_coeff [i] | | |
|     } | | |
|   } | | |
|   else if(gamut_resampling_type=='0010'){ | | |
|     reserved | 3 | uimsbf |
|     number_of_coeff | 5 | uimsbf |
|     for(i=0; i<number_of_coeff; i++) | | |
|       gamut_resampling_function_coeff [i] | | |
|   } | | |
|   else if (gamut_resampling_type= ='0011') { | | |
|     LUT_type | 4 | uimsbf |
|     reserved | 4 | uimsbf |
|     LUT_info () | | |
|   } | | |
| } | | |

FIG. 10

| Container_color_gamut_type | Description |
|---|---|
| 0000 | BT. 601 |
| 0001 | BT. 709 |
| 0010 | DCI-P3 |
| 0011 | BT. 2020 (NCL) |
| 0100 | BT. 2020 (CL) |
| 0101 | XYZ |
| 0110 | User defined |
| 0111~1111 | Reserved |

FIG. 11

| Content_color_gamut_type | Description |
|---|---|
| 0000 | BT. 601 |
| 0001 | BT. 709 |
| 0010 | DCI-P3 |
| 0011 | BT. 2020 (NCL) |
| 0100 | BT. 2020 (CL) |
| 0101 | XYZ |
| 0110 | User defined |
| 0111~1111 | Reserved |

FIG. 12

| Gamut_resampling_type | Description |
|---|---|
| 0000 | Pre-defined gamut re-sampling |
| 0001 | Gamut re-sampling functions |
| 0010 | Single function conversion |
| 0011 | Look-up table |
| 0100 ~ 1111 | Reserved |

FIG. 13

| color_space_type | Description |
|---|---|
| 0000 | CIE 1931 color space |
| 0001 | CIE Lab color space |
| 0010 | CIE Luv |
| 0011 ~ 1111 | Reserved |

FIG. 14

$$\begin{pmatrix} X \\ Y \\ Z \end{pmatrix} = \begin{pmatrix} \text{coeff}_{XYZ}[0] & \text{coeff}_{XYZ}[1] & \text{coeff}_{XYZ}[2] \\ \text{coeff}_{XYZ}[3] & \text{coeff}_{XYZ}[4] & \text{coeff}_{XYZ}[5] \\ \text{coeff}_{XYZ}[6] & \text{coeff}_{XYZ}[7] & \text{coeff}_{XYZ}[8] \end{pmatrix} \begin{pmatrix} r \\ g \\ b \end{pmatrix}$$

FIG. 15

$$\begin{pmatrix} r' \\ g' \\ b' \end{pmatrix} = \begin{pmatrix} \text{coeff}_{RGB'}[0] & \text{coeff}_{RGB'}[1] & \text{coeff}_{RGB'}[2] \\ \text{coeff}_{RGB'}[3] & \text{coeff}_{RGB'}[4] & \text{coeff}_{RGB'}[5] \\ \text{coeff}_{RGB'}[6] & \text{coeff}_{RGB'}[7] & \text{coeff}_{RGB'}[8] \end{pmatrix} \begin{pmatrix} X \\ Y \\ Z \end{pmatrix}$$

FIG. 16

$$\begin{pmatrix} r' \\ g' \\ b' \end{pmatrix} = \begin{pmatrix} \text{coeff}[0] & \text{coeff}[1] & \text{coeff}[2] \\ \text{coeff}[3] & \text{coeff}[4] & \text{coeff}[5] \\ \text{coeff}[6] & \text{coeff}[7] & \text{coeff}[8] \end{pmatrix} \begin{pmatrix} r \\ g \\ b \end{pmatrix}$$

FIG. 17

| LUT_type | Description |
|---|---|
| 0000 | LUT |
| 0001 | 3D LUT |
| 0010 | 3D LUT (linear interpolation) |
| 0011 ~ 1111 | Reserved |

FIG. 18

| Syntax | No. of bits | Mnemonic |
|---|---|---|
| TS_program_map_section( ) { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for(i=0; i < N;i++) { | | |
|         descriptor( ) | | |
|     } | | |
|     for(i=0; i < N;i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for(i=0; i < N2;i++) { | | |
|             descriptor( ) | | |
|         } | | |
|     } | | |
|     CRC_32 | 32 | rpchof |
| } | | |

FIG. 19

| Syntax | No. of bits | Format |
|---|---|---|
| UHD_program_info_descriptor ( ) { | | |
|     descriptor_tag | 8 | uimsbf |
|     descriptor_length | 8 | uimsbf |
|     UHD_service_type | 4 | uimsbf |
|     Reserved | 4 | |
| } | | |

FIG. 20

| UHD_service_type | Examples of use |
|---|---|
| 0000 | UHD1 |
| 0001 | UHD2 |
| 0010 - 0111 | Reserved |
| 1000 - 1111 | User_private |

FIG. 21

| Syntax | No. of bits | Mnemonic |
|---|---|---|
| event_information_table_section( ) { | | |
|   table_id | 8 | 0xCB |
|   section_syntax_indicator | 1 | '1' |
|   private_indicator | 1 | '1' |
|   reserved | 2 | '11' |
|   section_length | 12 | uimsbf |
|   source_id | 16 | uimsbf |
|   reserved | 2 | '11' |
|   version_number | 5 | uimsbf |
|   current_next_indicator | 1 | '1' |
|   section_number | 8 | uimsbf |
|   last_section_number | 8 | uimsbf |
|   protocol_version | 8 | uimsbf |
|   num_events_in_section | 8 | uimsbf |
|   for(j=0; j < num_events_in_section;j++) { | | |
|     reserved | 2 | '11' |
|     events_id | 14 | uimsbf |
|     start_time | 32 | uimsbf |
|     reserved | 2 | '11' |
|     ETM_location | 2 | uimsbf |
|     length_in_seconds | 20 | uimsbf |
|     title_length | 8 | uimsbf |
|     title_text( ) | var | |
|     reserved | 4 | '1111' |
|     descriptors_length | 12 | |
|     for(i=0; i < N;i++) { | | |
|       descriptor( ) | | |
|     } | | |
|   } | | |
|   CRC_32 | 32 | rpchof |
| } | | |

FIG. 22

| Syntax | No. of bits | Format |
|---|---|---|
| Gamut_resampling_info_descriptor ( ) { | | |
|     descriptor_tag | 8 | uimsbf |
|     descriptor_length | 8 | uimsbf |
|     gamut_resampling_metadata ( ) | | |
| } | | |

FIG. 23

| Syntax | No. of bits | Format |
|---|---|---|
| gamut_resampling_metadata (payloadSize) { | | |
|     Container_color_gamut_type | 4 | uimsbf |
|     Content_color_gamut_type | 4 | uimsbf |
|     if(Container_color_gamut_type=='0110'){ | | |
|         General_color_primaries ( ) | | |
|     } | | |
|     if(Content_color_gamut_type=='0110'){ | | |
|         General_color_primaries ( ) | | |
|     } | | |
|     reserved | 4 | uimsbf |
|     Gamut_resampling_type | 4 | uimsbf |
| } | | |

METHOD AND DEVICE FOR TRANSMITTING AND RECEIVING BROADCAST SIGNAL ON BASIS OF COLOR GAMUT RESAMPLING

This application is a National Stage Application of International Application No. PCT/KR2015/000068, filed on Jan. 5, 2015, which claims the benefit of U.S. Provisional Application No. 61/923,773, filed on Jan. 6, 2014, all of which are hereby incorporated by reference in their entirety for all purposes as if fully set forth herein.

TECHNICAL FIELD

The present invention relates to transmission and reception of a broadcast signal, and more particularly to a method and/or apparatus for transmitting and receiving a broadcast signal on the basis of color gamut resampling.

BACKGROUND ART

With increasing development of digital technology and communication technology, multimedia content based on audio/video (A/V) data has rapidly come into widespread use in various technical regions (e.g., broadcasts, movies, Internet, personal media, etc.) and the number of users who desire to use multimedia content is also rapidly increasing. In addition, with widespread use of 3DTV/3D movies capable of providing users with a stereoscopic three-dimensional (3D) effect, immersive media capable of providing the users with the 3D effect and stereo sound is rapidly increasing. In addition, as the TV screen is gradually increased in size in proportion to the increasing development of display technology, the number of users who desire high-quality content such as high definition (HD) content is also rapidly increasing. Therefore, many developers and companies are conducting intensive research into technology of immersive broadcasting TVs (such as 3DTVs and UHDTVs (Ultra High Definition TVs)) as next generation broadcast services to prepare for the Post-HDTV market. Specifically, in recent times, a variety of research into UHD (Ultra High Definition) broadcast services has been developed.

With increasing development of UHD displays and transceivers, UHD services have been intensively researched. An ultra high definition (UHD) broadcast may be distinguished from a legacy broadcast and provide a high sense of realism, by expressing colors and/or brightness which cannot be expressed in legacy content. However, many developers and companies are conducting intensive research into Wide Color Gamut (WCG) and/or High Dynamic Range (HDR) images and display devices for displaying WCG and/or HDR images.

UHD broadcasting aims to provide TV viewers with higher-quality images, higher-quality colors, and higher sense of immersion in a wider variety of aspects than conventional HD broadcasting. Therefore, a UHD broadcast associated standard has recently been established to define wider color gamut than in conventional TVs. UHD content can provide TV viewers with the best information similar to the original color directly obtained through HVS (Human Visual System), such that it can provide the TV viewers with higher-quality images and a greater sense of immersion. Although the current broadcast system is designed to perform various post-processing steps needed to implement color enhancement, prior to transmission of the content for optimum color implementation, the current broadcast system has difficulty in perfectly expressing various colors due to a difference in environment between the actual display environment of each user and the manufacturing environment of the content manufacturer. In order to provide improved broadcast services in UHD broadcast in a different way from the legacy HD broadcast, there have been intensively discussed various technologies for providing TV viewers with immersive content and a high sense of realism in various technical aspects. As a representative method for creating the content brightness expression range similar to visual sense of the TV viewer, there is a need to discuss and study High Dynamic Range (HDR).

Since a WCG based image format standard has recently been established, it will take a long period of time to rapidly spread WCG based image acquisition devices and WCG based display devices. Therefore, UHD service transmission standards will be established in consideration of future compatibility. In this case, video data having legacy color gamut may be supplied using the WCG transmission format. For this purpose, a method for providing a high-quality service in consideration of the display environment through proper processing of a receiver is needed.

In legacy analog broadcasting and SDTV/HDTV, the standard color gamut has been established simultaneously with development of video service technology, such that the same color gamut has been used in image acquisition, post-processing, transmission, and display in legacy analog broadcasting and SDTV/HDTV. In other words, a color gamut matching a target service is present. Thus, if a production and/or a transmitter performs post-processing on the basis of the matched color gamut and transmits the post-processed result, a difference in color gamut between respective steps need not be considered. However, various color gamuts have been considered in UHD, for example, REC.709 currently used in HDTVs, BT.2020 established as UHDTV standard, DCI-P3 including an intermediate range of HDTV and UHDTV, xvYCC, etc. The legacy image acquisition devices support only REC.709 based color gamuts, and the legacy display supports only REC.709 based images. As described above, it will takes a long period of time to introduce BT.2020 into the image acquisition device and the output device. In this case, considering the future compatibility problems, there is a need to research and develop services capable of supporting the above-mentioned two cases in a single broadcast service.

DISCLOSURE

Technical Problem

An object of the present invention is to provide a method and/or apparatus for transmitting and receiving a broadcast signal based on color gamut resampling, that substantially obviate(s) one or more problems due to limitations and disadvantages of the related art.

An object of the present invention is to provide a method for reducing display degradation at a receiver when a color gamut of original content is different from a color gamut of a container in which content is included and transmitted.

Another object of the present invention is to provide a method for discriminating between a color gamut of the content and a color gamut of the container, and signaling the discriminated result.

Another object of the present invention is to provide a method for providing signaling information for resampling of a color gamut when a color gamut of the content is different from a color gamut of the container.

Another object of the present invention is to provide a method for determining whether a color gamut is resampled according to a display performance of a receiver and providing optimum content appropriate for the display performance of the receiver.

Technical Solution

The object of the present invention can be achieved by providing a method for transmitting a broadcast signal including: resampling content data based on a first color gamut into content data based on a second color gamut; generating signaling information including color gamut resampling information indicating information of the resampling; encoding the generated signaling information and the content data based on the second color gamut; and transmitting the encoded content data and the encoded signaling information.

The color gamut resampling information may include information regarding the first color gamut, information regarding the second color gamut, color gamut resampling type information indicating a scheme of the resampling, and detailed information of a color gamut resampling type based on the color gamut resampling type information.

Information regarding the first color gamut information may include not only information indicating a type of the first color gamut, but also coordinate information in a color space of a reference color for defining the first color gamut when the first color gamut is not identical to a legacy defined color gamut. Information regarding the second color gamut may include not only information indicating a type of the second color gamut, but also coordinate information in a color space of a reference color for defining the second color gamut when the second color gamut is not identical to a legacy defined color gamut.

If the resampling scheme based on the color gamut resampling type information is a method for converting the content data based on the first color gamut into a neutral color space value not affected by a color gamut and converting the converted neutral color space value into the content data based on the second color gamut, the detailed information of the color gamut resampling type may include information indicating a type of the neutral color space, coefficient information of a conversion equation for converting content data based on the first color gamut into the neutral color space value, and coefficient information of a conversion equation for converting the converted neutral color space value into content data based on the second color gamut.

If the resampling scheme based on the color gamut resampling type information is a method for directly converting the content data based on the first color gamut into content data based on the second color gamut, the detailed information of the color gamut resampling type may include coefficient information of a conversion equation for converting content data based on the first color gamut into the content data based on the second color gamut. If the resampling scheme based on the color gamut resampling type information is a method for employing a lookup table indicating mapping information between the content data based on the first color gamut and the content data based on the second color gamut, the detailed information of the color gamut resampling type may include type information of the lookup table and constituent element information of the lookup table.

The signaling information may include a Program Map Table (PMT) message, an Event Information Table (EIT) message, a Video Usability Information (VUI) message, and a Supplemental Enhancement Information (SEI) message. At least one of the Program Map Table (PMT) and the Event Information Table (EIT) may include identification (ID) information for identifying that a broadcast service contained in the broadcast signal is a broadcast service based on the color gamut resampling.

The color gamut resampling information may be contained in at least one of the Program Map Table (PMT) message, the Event Information Table (EIT) message, the Video Usability Information (VUI) message, and the Supplemental Enhancement Information (SEI) message.

In accordance with another aspect of the present invention, a method for receiving a broadcast signal includes: receiving content data based on a first color gamut and signaling information including color gamut resampling information regarding the content data based on the first color gamut; decoding each of the received signaling information and the content data based on the first color gamut; and on the basis of the decoded signaling information, resampling content data based on the decoded first color gamut into content data based on a second color gamut, outputting the resampled data to a display based on the second color gamut or outputting content data based on the decoded first color gamut to a display based on the first color gamut.

The color gamut resampling information may include information regarding the first color gamut, information regarding the second color gamut, color gamut resampling type information indicating a scheme of the resampling, and detailed information of a color gamut resampling type based on the color gamut resampling type information.

Information regarding the first color gamut information may include not only information indicating a type of the first color gamut, but also coordinate information in a color space of a reference color for defining the first color gamut when the first color gamut is not identical to a legacy defined color gamut. Information regarding the second color gamut may include not only information indicating a type of the second color gamut, but also coordinate information in a color space of a reference color for defining the second color gamut when the second color gamut is not identical to a legacy defined color gamut.

If the resampling scheme based on the color gamut resampling type information is a method for converting the content data based on the first color gamut into a neutral color space value not affected by a color gamut and converting the converted neutral color space value into the content data based on the second color gamut, the detailed information of the color gamut resampling type may include information indicating a type of the neutral color space, coefficient information of a conversion equation for converting content data based on the first color gamut into the neutral color space value, and coefficient information of a conversion equation for converting the converted neutral color space value into content data based on the second color gamut.

If the resampling scheme based on the color gamut resampling type information is a method for directly converting the content data based on the first color gamut into content data based on the second color gamut, the detailed information of the color gamut resampling type may include coefficient information of a conversion equation for converting content data based on the first color gamut into the content data based on the second color gamut. If the resampling scheme based on the color gamut resampling type information is a method for employing a lookup table indicating mapping information between the content data based on the first color gamut and the content data based on the second color gamut, the detailed information of the color gamut resampling type may include type information of the lookup table and constituent element information of the lookup table.

The signaling information may include a Program Map Table (PMT) message, an Event Information Table (EIT) message, a Video Usability Information (VUI) message, and a Supplemental Enhancement Information (SEI) message. At least one of the Program Map Table (PMT) and the Event Information Table (EIT) may include identification (ID) information for identifying that a broadcast service contained in the broadcast signal is a broadcast service based on the color gamut resampling.

The color gamut resampling information may be contained in at least one of the Program Map Table (PMT) message, the Event Information Table (EIT) message, the Video Usability Information (VUI) message, and the Supplemental Enhancement Information (SEI) message.

In accordance with another aspect of the present invention, an apparatus for transmitting a broadcast signal includes: a color gamut resampling unit configured to resample content data based on a first color gamut into content data based on a second color gamut; a signaling information generator configured to generate signaling information including color gamut resampling information indicating information of the resampling; an encoder configured to encode the generated signaling information and the content data based on the second color gamut; and a transmitter configured to transmit the encoded content data and the encoded signaling information.

In accordance with another aspect of the present invention, a apparatus for receiving a broadcast signal includes: a receiver configured to receive content data based on a first color gamut and signaling information including color gamut resampling information regarding the content data based on the first color gamut; a decoder configured to decode each of the received signaling information and the content data based on the first color gamut; and an output unit, on the basis of the decoded signaling information, configured to resample content data based on the decoded first color gamut into content data based on a second color gamut, output the resampled data to a display based on the second color gamut or output content data based on the decoded first color gamut to a display based on the first color gamut.

Advantageous Effects

As is apparent from the above description, the embodiments of the present invention can transmit and receive a broadcast signal based on color gamut resampling.

The embodiments of the present invention can reduce display degradation at a receiver when a color gamut of original content is different from a color gamut of a container in which content is included and transmitted.

The embodiments of the present invention receive each of the color gamut of the content and a color gamut of the container prior to content reception, such that the presence or absence of the necessity of color gamut resampling can be determined in advance prior to reception of the content.

The embodiments of the present invention can determine whether the color gamut is resampled according to display performance of the receiver, thus providing optimum content appropriate for the display performance of the receiver.

The embodiments of the present invention can support all displays having different color gamuts.

The embodiments of the present invention can simultaneously support various UHD services through only one broadcast system.

DESCRIPTION OF DRAWINGS

FIG. 2 is a conceptual diagram illustrating a video transmission/reception process according to an embodiment of the present invention.

FIG. 5 is a conceptual diagram illustrating a video post-processing operation according to an embodiment of the present invention.

FIG. 6 is a view illustrating a supplemental enhancement information (SEI) message structure including 'gamut_resampling_info(payloadsize)' according to an embodiment of the present invention.

FIG. 7 is a view illustrating 'gamut_resampling_info (payloadsize)' according to an embodiment of the present invention.

FIG. 8 is a view illustrating 'general_color_primaries( )' according to an embodiment of the present invention.

FIG. 9 is a view illustrating 'general_color_primaries( )' according to an embodiment of the present invention.

FIG. 10 is a view illustrating 'container_color_gamut_type' according to an embodiment of the present invention.

FIG. 11 is a view illustrating 'content_color_gamut_type' according to an embodiment of the present invention.

FIG. 12 is a view illustrating 'gamut_resampling_type' according to an embodiment of the present invention.

FIG. 13 is a view illustrating 'color_space_type' according to an embodiment of the present invention.

FIG. 14 is a view illustrating a conversion equation according to a mapping function that converts RGB values based on a current color gamut into XYZ values during a gamut resampling process according to an embodiment of the present invention.

FIG. 15 is a view illustrating a conversion equation according to a mapping function that converts a color denoted by XYZ values into RGB values based on a target color gamut during a gamut resampling process according to an embodiment of the present invention.

FIG. 16 is a view illustrating a conversion equation according to a mapping function that converts RGB values based on a current color gamut for use in a single conversion equation into R'G'B' values based on a target color gamut according to an embodiment of the present invention.

FIG. 17 is a view illustrating 'LUT_type' according to an embodiment of the present invention.

FIG. 18 is a view illustrating a Program Map Table (PMT) according to an embodiment of the present invention.

FIG. 19 is a view illustrating 'UHD_program_info_descriptor( )' according to an embodiment of the present invention.

FIG. 20 is a view illustrating 'UHD_service_type' according to an embodiment of the present invention.

FIG. 21 is a view illustrating an Event information Table (EIT) according to an embodiment of the present invention.

FIG. 22 is a view illustrating 'gamut_resampling_info_descriptor( )' according to an embodiment of the present invention.

FIG. 23 is a view illustrating 'gamut_resampling_metadata( )' according to an embodiment of the present invention.

BEST MODE

Reference will now be made in detail to the embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

Although most terms of elements in this specification have been selected from general ones widely used in the art taking into consideration functions thereof in this specification, the terms may be changed depending on the intention or convention of those skilled in the art or the introduction of new technology. Some terms have been arbitrarily selected by the applicant and their meanings are explained in the following description as needed. Thus, the terms used in this specification should be construed based on the overall content of this specification together with the actual meanings of the terms rather than their simple names or meanings.

Figure 1:
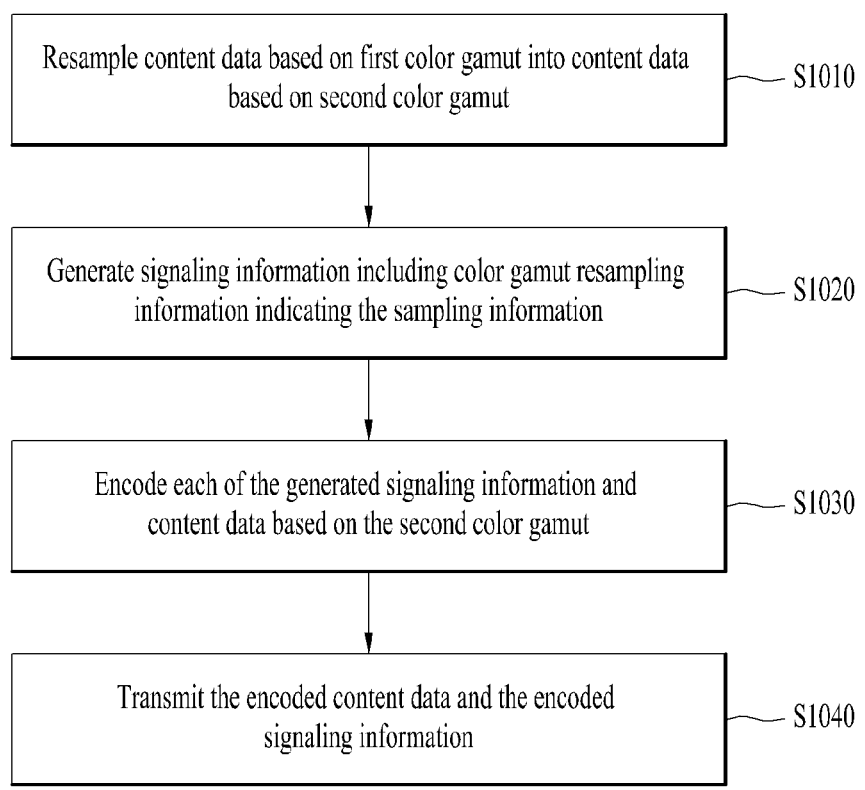
FIG. 1 is a flowchart illustrating a method for transmitting a broadcast signal according to an embodiment of the present invention.

FIG. 1 is a flowchart illustrating a method for transmitting a broadcast signal according to an embodiment of the present invention.

Referring to FIG. 1, the embodiment of the present invention can transmit a broadcast signal using the following process. A transmitter according to one embodiment of the present invention may resample content data based on a first color gamut into content data based on a second color gamut (S1010). The first color gamut may indicate a color gamut of original content data acquired from a camera. For example, the first color gamut may be REC.709 color gamut. In accordance with one embodiment, from the viewpoint of the transmitter, a first color gamut may be referred to as a content color gamut. The second color gamut may be a color gamut for editing and/or transmitting content data. For example, the second color gamut may be BT.2020 color gamut. In accordance with one embodiment, from the viewpoint of a transmitter, the second color gamut may be referred to as a container color gamut. In accordance with one embodiment, the color gamut may indicate a color expression range or a color space. The resampling step (S1010) according to an embodiment will hereinafter be given with reference to FIGS. 2 and 24. Thereafter, the transmitter according to one embodiment may generate signaling information including color gamut resampling information indicating the above-mentioned resampling information (S1020). The color gamut resampling information according to one embodiment may indicate 'gamut_resampling_info(payloadsize)', and may be different in meaning from 'gamut_resampling_info (payloadsize)'. The step (S1020) for generating signaling information according to one embodiment of the present invention will hereinafter be given with reference to FIGS. 6, 7, 8, 18, 19, 21, 22, and 23. Thereafter, the transmitter according to one embodiment may encode each of the generated signaling information and resampled content data based on the second color gamut (S1030), and as such a detailed description thereof will hereinafter be given with reference to FIG. 24. The transmitter according to an embodiment of the present invention may transmit encoded content data and encoded signaling information (S1040). In this case, content data and/or signaling information may be transmitted through a terrestrial broadcast network, a cable network, and/or the Internet. A detailed description thereof will hereinafter be given with reference to FIG. 24.

The above-mentioned color gamut resampling information according to another embodiment of the present invention may include first color gamut information, second color gamut information, color gamut resampling type information indicating the resampling method, and/or detailed information of the color gamut resampling type based on the color gamut resampling type information. In accordance with one embodiment, from the viewpoint of the transmitter, the first color gamut information may include 'content_color_gamut_type' and/or 'general_color_primaries( )'. The second color gamut information may include 'container_color_gamut_type' and/or 'general_color_primaries( )'. The color gamut resampling type information according to one embodiment may indicate 'gamut_resampling_type', and the detailed information of the color gamut resampling type may indicate 'gamut_resampling_info( )'. A detailed description thereof will hereinafter be given with reference to FIGS. 6 to 17.

In accordance with another embodiment, assuming that type information of the first color gamut and/or the first color gamut are/is not identical to the legacy defined color gamut, the first color gamut information may include coordinate information on a gamut (color space) of a reference color for defining the first color gamut. Assuming that type information of the second color gamut and/or the second color gamut are/is not identical to the legacy defined color gamut, the second color gamut information may include coordinate information on a gamut (color space) of a reference color for defining the second color gamut. The color gamut according to one embodiment may correspond to a color gamut defined as the legacy standard, or may correspond to a color gamut defined at random. The type information of the first color gamut according to one embodiment may indicate 'content_color_gamut_type', and the coordinate information on a gamut (color space) of a reference color for defining the first color gamut, instead of the legacy defined color gamut, may indicate coordinate information contained in 'general_color_primaries( )'. Information indicating the second color gamut type according to an embodiment of the present invention may indicate 'container_color_gamut_type'. If the second color gamut is not identical to the legacy defined color gamut, the coordinate information on a gamut (color space) of a reference color for defining the second color gamut may indicate coordinate information contained in 'general_color_primaries( )'. A detailed description thereof will hereinafter be given with reference to FIGS. 7 and 8.

In accordance with another embodiment, if the resampling scheme based on the color gamut resampling type information is a data conversion scheme in which content data based on the first color gamut is converted into a neutral gamut value not affected by the color gamut and the converted neutral gamut value is converted into content data based on the second color gamut, detailed information of the color gamut resampling type may include type information indicating the neutral color gamut, coefficient information of a conversion equation used to convert content data based on the first color gamut into the neutral color space value, and/or coefficient information of a conversion equation used to convert the converted neutral color space value into content data based on the second color gamut. Information indicating the neutral color space type according to an embodiment may indicate 'color_space_type'. Coefficient information of the conversion equation used to convert content data based on the first color gamut into the neutral color space value may indicate 'RGB_XYZ_mapping_function_coeff[i]'. The coefficient information of the conversion equation used to convert the converted neutral color space value into content data based on the second color gamut may indicate 'XYZ_to_RGBprime_mapping_function_coeff[i]. A detailed description thereof will hereinafter be given with reference to FIGS. 7 and 9.

In accordance with another embodiment, if the resampling scheme according to the color gamut resampling type information is the scheme for converting content data based on the first color gamut into content data based on the second color gamut, detailed information of the color gamut resampling type may include coefficient information of a conversion equation used to convert content data based on the first color gamut into content data based on the second color gamut. If the resampling scheme based on the color gamut resampling type information is the scheme for employing a lookup table for indicating content data based on the first color gamut and mapping information of the content data based on the second color gamut, detailed information of the color gamut resampling type may include type information of the lookup table and the constituent element information of the lookup table. In accordance with detailed information of the color gamut resampling type according to an embodiment, the coefficient information of a conversion equation used to convert content data based on the first color gamut into content based on the second color gamut may indicate 'gamut_resampling_function_coeff[i]', and type information of the lookup table may indicate 'LUT_type', and the constituent element information of the lookup table may indicate 'LUT_info( )'. A detailed description thereof will hereinafter be given with reference to FIGS. 7 and 9.

In accordance with another embodiment, the signaling information may include a Program Map Table (PMT), an Event Information Table (EIT), a Video Usability Information (VUI) message, and/or a Supplemental Enhancement Information (SEI) message. At least one of PMT and EIT according to an embodiment of the present invention may include identification (ID) information for identifying that a broadcast service contained in the transmitted broadcast signal is a broadcast service based on the color gamut resampling. A detailed description thereof will hereinafter be given with reference to FIGS. 6, 18, 19, 20, and 21.

In accordance with another embodiment, the color gamut resampling information may be contained in at least one of PMT, EIT, VUI, and SEI messages. A detailed description thereof will hereinafter be given with reference to FIGS. 6, 7, 18, 19, 20, 21, 22, and 23.

FIG. 2 is a conceptual diagram illustrating a video transmission/reception (Tx/Rx) process according to an embodiment of the present invention.

Referring to FIG. 2, the video transmission/reception (Tx/Rx) process according to an embodiment of the present invention may include a legacy content acquisition process (legacy image sensor/legacy content, REC. 709) 2010, a gamut re-sampling process 2020, a production/content production process (production/content provider, BT. 2020) 2030, an inverse process of gamut resampling (gamut re-sampling, inverse) 2040, and/or a display process (legacy display, REC. 709) 2050.

In the legacy content acquisition process (legacy image sensor/legacy content, REC. 709) 2010, one embodiment of the present invention may acquire the legacy content acquired by the legacy camera. The legacy content according to an embodiment may be based on REC. 709 color gamut. Legacy content color based on REC. 709 color gamut may be denoted by a triangle 2060 as shown in the color coordinate plane.

The gamut resampling process 2020 may use colors commonly expressed in two different color gamuts, such that RGB or YCbCr values based on only one color gamut are converted into RGB or YCbCr values based on different color gamuts. In accordance with one embodiment, although the colors are located at the same coordinates on the color coordinate plane, if the colors are based on different color gamuts, RGB or YCbCr values may be changed. In the sampling process in which the color gamuts having different widths are sampled into the same number of digital values, the sampled resultant values are mapped to different digital values, such that RGB or YCbCr values may be acquired. For example, if color values are displayed on the display having a bit depth of 8 bits, and if RGB or YCbCr based on BT.709 are expressed in association with the color coordinates (0.3, 0.6) of the color coordinate plane, the resultant values (0, 255, 0) are acquired. If RGB or YCbCr based on BT.2020 are expressed, new values denoted by (10, 200, 30) are acquired. In this case, the above-mentioned color coordinate plane may correspond to CIE 1931 xy chromaticity diagram. In other words, the gamut resampling (2020, 2040) according to one embodiment may indicate that a digital value defined by one color gamut is denoted by another digital value based on another color gamut. The gamut resampling according to an embodiment of the present invention converts a color space of the content into a reference color space in such a manner that the reference color space is not affected by the color gamut on the color coordinate plane. Thereafter, the color gamut is converted into a target color gamut, and bit quantization is then carried out. That is, according to one embodiment, after color expression is carried out in a neutral space not affected by a given color gamut through the mapping process in which RGB colors based on a specific color gamut are mapped to the color coordinate plane, the resultant values may also be re-expressed by another value based on a new color gamut. The above-mentioned processes may correspond to a process for re-expressing the color defined in an overlap range of two color gamuts into another value based on the new color gamut. For example, if colors present in the wide color gamut (WCG) need to be expressed as a small color gamut, the above-mentioned process may have the same effects as in the clipping of colors escaping from the above gamut. RGB according to one embodiment may be represented by a combination of three colors (Red, Green, Blue) as one kind of a color model. For example, in the above RGB model, a black color may be denoted by R=G=B=0, a white color may be denoted by R=G=B=255, and a yellow color may be denoted by R=G=255. In accordance with one embodiment, YCbCr is a kind of a color space used in an image system, and may denote a color expression scheme for separating a luminance (brightness) component and a chrominance component from color information. In this case, Y may denote a luminance signal, and Cb and Cr may denote chrominance signals. YCbCr may not indicate the color space absolutely, and may correspond to the color expression scheme in which RGB information in which RGB primary colors have uniform visual information is converted into different kinds of information composed of a luminance signal and a chrominance signal by an equation.

In the production/content production process (production/content provider, BT.2020) 2030, images of the gamut resampled content according to one embodiment may be corrected and/or edited, and the content may be transmitted on the basis of the color gamut converted in the gamut resampling process. A detailed description thereof is as follows.

The inverse process of the gamut resampling (gamut re-sampling, inverse) 2040 may be identical to the above-mentioned gamut resampling process 2020. For example, assuming that REC.709 color gamut is converted into BT.2020 color gamut in the gamut resampling process 2020, the BT.2020 color gamut may be converted into REC.709 color gamut in the gamut resampling inverse process 2040. In accordance with one embodiment, if the new color gamut is mapped, the quantization process is performed according to a display bit depth, resulting in formation of the last pixel value.

In the display process (legacy display, REC.709) 2050, content based on the color gamut converted by the gamut resampling inverse process 2040 according to one embodiment may be displayed. For example, in the gamut resampling inverse process 2040, a target color gamut (BT.2020) may be converted into REC.709 color gamut corresponding to a color gamut of the legacy content. The legacy display according to an embodiment may display a legacy content based on REC.709 color gamut.

In accordance with one embodiment, if the color gamut needed for color encoding follows the UHDTV standard and the content and display color gamut follows the legacy standard, one embodiment of the present invention may transmit two kinds of color gamut information and the gamut resampling information to the receiver such that the embodiment can support all displays having different color gamuts. In accordance with one embodiment, differently from the legacy scalable based extension, the embodiment may use the legacy codec without change, and may consider future extensibility on the basis of video information, such that the embodiment may be used to provide various UHD services. For example, the embodiment may simultaneously support UHD-1 phase 1 and 2 services in DVB.

In accordance with one embodiment, assuming that UHDTV standard color gamut is used in color encoding, a method for employing different color gamuts may be beneficial to the future extensibility and persistency of the future production infrastructure, and may also support various kinds of image acquisition and display devices ranging from current popular devices to devices to be used in future. In accordance with one embodiment, if the legacy HDTV content is provided in the UHDTV environment, the issues encountered in the color gamut aspect may be addressed.

The embodiment of the present invention may also be applied to an exemplary case in which a color gamut wider than that of BT.2020 is applied to the color encoding in the same manner as in XYZ.

Figure 3:
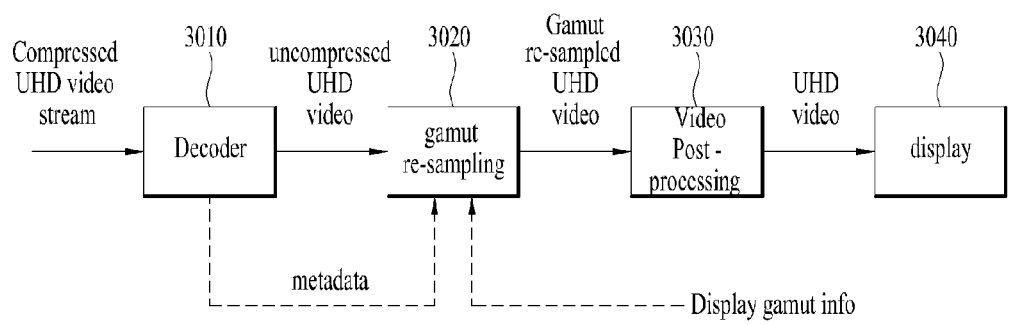
FIG. 3 is a conceptual diagram illustrating the operations of a receiver according to an embodiment of the present invention.

FIG. 3 is a conceptual diagram illustrating the operations of a receiver according to an embodiment of the present invention.

Referring to FIG. 3, the receiver operation according to one embodiment may include a decoding process (decoder) 3010, a gamut re-sampling process 3020, a video post-processing process (video post-processing) 3030, and/or a display process (display) 3040.

In the decoding process (decoder) 3010, the receiver according to one embodiment may receive a compressed UHD video stream and decode the received compressed UHD video stream.

In the gamut resampling process (gamut resampling) 3020, the receiver may convert a color gamut in which decoded UHD video (i.e., uncompressed UHD video) is represented. In this case, information regarding a color gamut of the container, information regarding the color gamut of the content and/or information regarding the color gamut of the display may be used, and a detailed description thereof will hereinafter be given.

In the video post-processing step 3030, the receiver may post-process the gamut resampled UHD video such that UHD video having superior image quality can be generated. A detailed description thereof is as follows.

In the display process (display) 3040, the receiver may display the post-processed UHD video.

Figure 4:
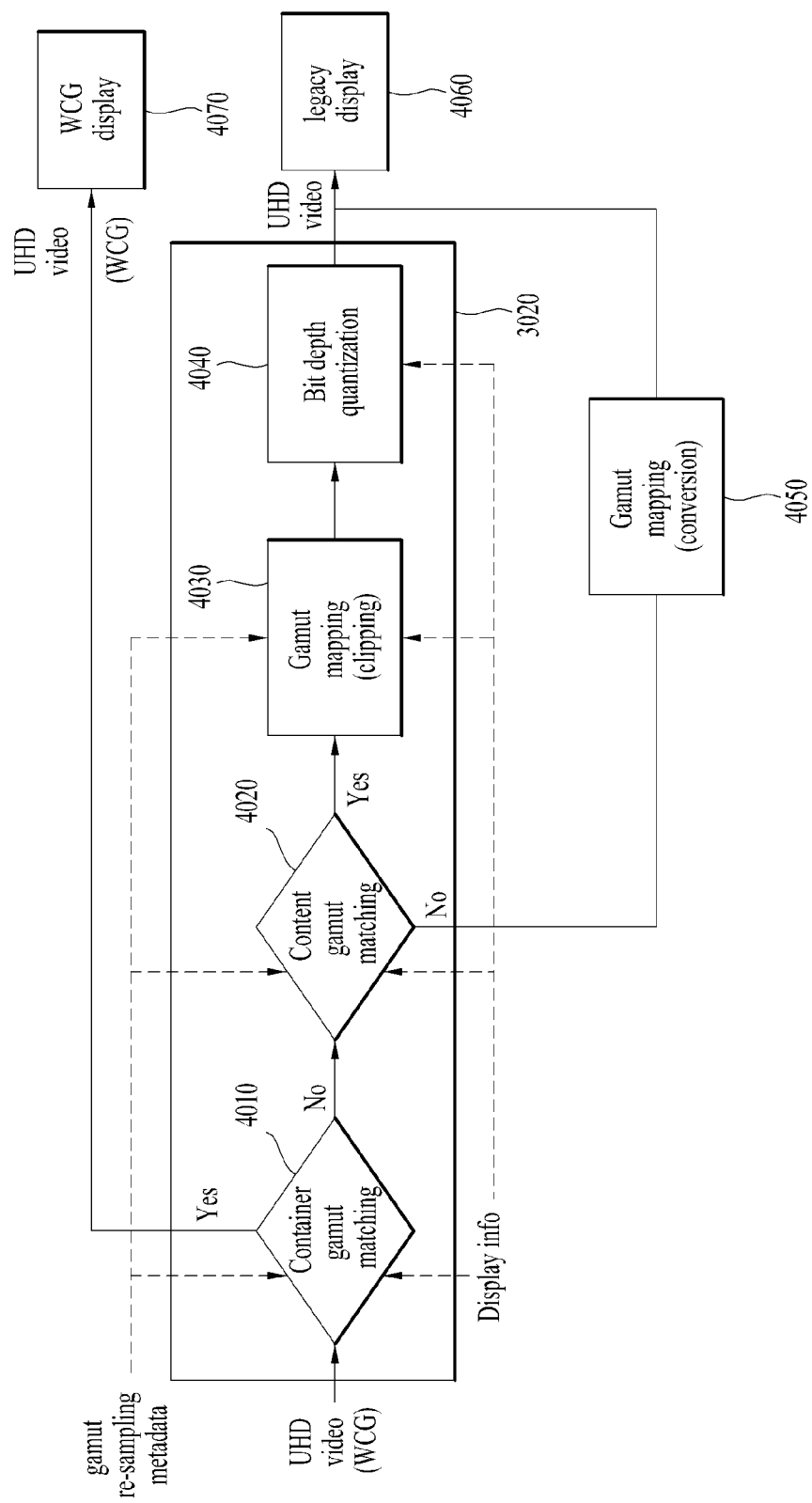
FIG. 4 is a conceptual diagram illustrating receiver's operations including a detailed operation of a gamut resampling process according to an embodiment of the present invention.

FIG. 4 is a conceptual diagram illustrating receiver operations including a detailed operation of the gamut resampling process according to an embodiment of the present invention.

Referring to FIG. 4, the gamut resampling process 3020 according to one embodiment may include a container gamut matching process 4010, a content gamut matching process 4020, a first gamut mapping (clipping) process 4030, and/or a bit depth quantization process 4040. The receiver operation according to one embodiment may include the gamut resampling process 3020, a second mapping (conversion) process 4050, a legacy display process (legacy display) 4060, and/or a WCG display process 4070.

In accordance with one embodiment, the receiver operation may be classified into one case in which the display of the receiver is the legacy display and the other case in which the display of the receiver is a WCG UHD display according to display characteristics of the receiver.

If the display of the receiver according to one embodiment is the legacy display (scenario 1), that is, if the video color gamut transmitted through a Video Usability Information (VUI) or Supplemental Enhancement Information (SEI) message is not displayed by the receiver, the receiver may perform video processing to be suitable for legacy display.

In the container gamut matching process 4010, color gamuts of the container transmitted through VUI or SEI message may be compared with the color gamut of the display. In this case, the colour_primaries defined in VUI or the container_color_gamut_type may be used. If the receiver does not express the color gamut of the received container, that is, if the display of the receiver is the legacy display, the receiver may convert the received image into an image appropriate for the legacy display of the receiver through the additional processing to be described.

If the color gamut of the container is not expressed by the display of the receiver, color gamut information of the content may be compared with the color gamut of the display during the content gamut matching process 4020. If the color gamut of the content is matched to the color gamut of the display, the gamut resampling process will be carried out through the first gamut mapping process to be described later. In contrast, if the color gamut of the content is not matched to the color gamut of the display, a color expression range of the content can be converted such that the color expression range of the content can be displayed in the color expression range of the display through the second gamut mapping process to be described later.

The first gamut mapping process (gamut mapping (clipping)) 4030 may correspond to the process in which WCG expressed content for supporting WCG display is re-converted into the original color expression range. The following process may be broadly classified into two processes. First, the receiver may convert a wide color gamut (WCG) for supporting WCG display into a relatively smaller color gamut. In this case, conversion of the color gamut may use a conversion function promised between two color gamuts (gamut_resampling_type=predefined gamut re-sampling), an element function per step for gamut resampling conversion may be directly transmitted, or such conversion of the color gamut may be achieved by a method for simultaneously transmitting the entire gamut resampling conversion equation or the LUT-shaped conversion function. The first gamut mapping process according to an embodiment of the present invention may also be applied to the case in which color gamut clipping is used. That is, the receiver may generate the clipping effect through hard thresholding when "out of gamut" occurs in a predetermined time in which WCG is displayed on the legacy display.

The bit depth quantization process 4040 may correspond to the process in which, after the above-mentioned first gamut mapping process is achieved, bit depths of colors expressed on the basis of the original color gamut are quantized according to the bit depth of the display. The bit depth quantization process 4040 may indicate the process in which the image having a changed color gamut is changed according to the bit depth of the display.

The second gamut mapping process (gamut mapping (conversion)) 4050 may correspond to the process in which, when the color gamut of the legacy display is not matched to the color gamut of the content, the color based on the content color gamut is converted on the basis of the color gamut of the display. In this case, if the color gamut of the legacy display is not matched to the color gamut of the content, the content may correspond to WCG content. In this case, although the receiver performs clipping of the WCG content and reproduces the clipped WCG content on the legacy display, the color corresponding to "out of gamut" is properly expressed on the basis of the color gamut of the display so as to implement superior color sense, and at the same time WCG content may be converted in a manner that original colors of the colors present in the gamut remain unchanged.

The legacy display process (legacy display) 4060 may correspond to the process for reproducing video data fabricated through the above-mentioned process at the legacy UHD display. If necessary, prior to display of video data, the embodiment of the present invention can provide superior image quality through post-processing of video data of the receiver.

If the display of the receiver according to one embodiment is the WCG UHD display (scenario 2), that is, if the video color gamut transmitted through a Video Usability Information (VUI) or Supplemental Enhancement Information (SEI) message can be displayed by the receiver, the receiver may reproduce content without gamut resampling processing based on the following operation.

In the container gamut matching process 4010, the receiver may compare the color gamut of the container transmitted through the VUI or SEI message with the color gamut of the display, and may determine whether the colors of the content transmitted from the display of the corresponding receiver can be expressed or not. If it is determined that the receiver can express the color gamut of the transmitted container, the display of the receiver may be determined to be a WCG UHD display, and the receiver may display the received content without additional processing.

In the WCG display process (WCG display) 4070, if the receiver can efficiently express the color gamut of the received container, that is, if the display of the receiver is the WCG UHD display, the transmitted video may be immediately reproduced on the WCG UHD display. If necessary, one embodiment of the present invention may provide superior image quality through video post-processing of the receiver, prior to display of video data.

In accordance with one embodiment, during the container gamut matching process 4010, the content gamut matching process 4020, the first gamut mapping (clipping) process 4030, the bit depth quantization process 4040, and/or the gamut resampling process 3020, the gamut resampling metadata and/or the display information may be used, gamut resampling metadata may include a color gamut of the container and color gamut information of the content. The display information may include information regarding the color gamut of the display.

FIG. 5 is a conceptual diagram illustrating a video post-processing operation according to an embodiment of the present invention.

Referring to FIG. 5, the video post-processing process 3030 according to one embodiment may include a tone mapping process 5010, a transfer curve process 5020, and/or a color correction matrix 5030.

In the tone mapping process 5010, a bright part of the gamut resampled video may be changed to a clear video image, and a dark part of the gamut resampled video may be changed to a brighter image.

In the transfer curve process 5020, the tone-mapped video can be converted into higher-image-quality video using a transfer curve.

In the color correction matrix process 5020, video may be converted into color-corrected video using a color correction matrix.

FIG. 6 is a view illustrating a supplemental enhancement information (SEI) message structure including 'gamut_resampling_info(payloadsize)' according to an embodiment of the present invention.

Referring to FIG. 6, 'gamut_resampling_info(payloadsize)' according to an embodiment may be contained in payload of the packet having transmitted the SEI message, and then transmitted. In accordance with one embodiment, the above-mentioned 'gamut_resampling_info(payloadsize)' may indicate a gamut re-sampling information descriptor.

FIG. 7 is a view illustrating 'gamut_resampling_info (payloadsize)' according to an embodiment of the present invention.

Referring to FIG. 7, 'gamut_resampling_info(payloadsize)' may include a 'container_color_gamut_type' field, a 'content_color_gamut_type' field, a 'general_color_primaries( )' field, a 'gamut_resampling_type' field, and/or a 'gamut_resampling_info( )'.

Prior to provision of the content, the container_color_gamut_type field may indicate the color expression gamut used as a reference of the image post-processing operation (task) and transmission. In accordance with one embodiment, it is assumed that the color gamut used in the image post-processing operation is identical to the color gamut used in the color encoding. In accordance with another embodiment, assuming that the color gamut used in the post-processing operation is different from the color gamut used in the color encoding, each color gamut may be signaled separately, and the color gamut used in the color encoding may be used as a reference. In accordance with one embodiment, if the color gamut defined as a standard can be signaled and the arbitrary color expression gamut is used, this field is set to '0110', and red, green, blue, and white coordinates may be signaled through RGBW_primaries( ). A detailed description of the above-mentioned field value is as follows.

The content_color_gamut_type field may indicate the color expression gamut of the original content. The content_color_gamut_type field may perform signaling of the standard color gamut. If the arbitrary color expression gamut is used, the content_color_gamut_type field is set to '0110', and red, green, blue, white coordinates may be signaled through RGBW_primaries( ). A detailed description of the above-mentioned field value is as follows.

The gamut_resampling_type field may indicate the gamut resampling type for calculating a predetermined value obtained when a color in which a color gamut of the container is expressed as a reference is expressed using the color gamut of the content as a reference. A detailed description of the above-mentioned field value is as follows.

The general_color_primaries( ) and gamut_resampling_info( ) fields will hereinafter be given in detail.

In accordance with one embodiment of the present invention, the gamut_resampling_info(payloadsize) field may be different from gamut_resampling_info( ) contained in the gamut_resampling_info(payloadsize) field.

FIG. 8 is a view illustrating 'general_color_primaries( )' according to an embodiment of the present invention.

In accordance with one embodiment, if the container color gamut or the color gamut type of the content color gamut indicate that arbitrary values instead of the standard values are used, the transmitter may transmit color space coordinates of the color gamut capable of defining the color gamut. In accordance with one embodiment, the color gamut may be defined on the basis of red, green, blue, and white (R, G, B, W) values. In addition, according to another embodiment, the color gamut may be defined using a color primary other than RGB values. In this case, the color gamut may be expressed through general_color_primaries( ).

In accordance with one embodiment, general_color_primaries( ) may have a descriptor format.

The general_color_primaries( ) field according to one embodiment may include a RGBW_primary_flag field, a color_primary_r_x field, a color_primary_r_y field, a color_primary_g_x field, a color_primary_g_y field, a color_primary_b_x field, a color_primary_b_y field, a color_primary_numbers_minus_3 field, a color_primary_x[i] field, a color_primary_y[i] field, a white_primary_x field, and/or a white_primary_y field.

The RGBW_primary_flag field may indicate a method for expressing an arbitrary color gamut. If the color gamut is indicated based on three arbitrary primary colors (RGB), this field may be set to '1'. If the color gamut is indicated based on the remaining values other than RGB values, this field may be set to zero '0'.

The color_primary_r_x field may indicate x coordinates of R (red) color in the color space. The color_primary_r_x field may indicate a binary value of each value interposed between '0' and '1', and may indicate a difference between each binary value and a reference value.

The color_primary_r_y field may indicate y coordinates of R color in the color space. The color_primary_r_y field may indicate a binary value of each value interposed between '0' and '1', and may indicate a difference between each binary value and a reference value.

The color_primary_g_x field may indicate x coordinates of G (green) color in the color space. The color_primary_g_x field may indicate a binary value of each value interposed between '0' and '1', and may indicate a difference between each binary value and a reference value.

The color_primary_g_y field may indicate y coordinates of G color in the color space. The color_primary_g_y field may indicate a binary value of each value interposed between '0' and '1', and may indicate a difference between each binary value and a reference value.

The color_primary_b_x field may indicate x coordinates of B (blue) color in the color space. The color_primary_b_x field may indicate a binary value of each value interposed between '0' and '1', and may indicate a difference between each binary value and a reference value.

The color_primary_b_y field may indicate y coordinates of B color in the color space. The color_primary_b_y field may indicate a binary value of each value interposed between '0' and '1'. In this case, the above-mentioned color space may correspond to CIE 1931.

The color_primary_numbers_minus_3 field may indicate the number of color primary values when the color expression gamut is defined using the color primary other than RGB. In accordance with one embodiment, it is assumed that a minimum primary value for indicating a plurality of colors in the color coordinate plane is set to 3, and the number of available color primary values is denoted by '3<=color_primary_numbers_minus_3+3<=18'.

If the color expression gamut is defined using the color primary other than RGB, the color_primary_x[i] field may indicate x coordinates in the color space of the i-th color primary. The color_primary_x[i] field may indicate a binary value of each value interposed between '0' and '1', and may indicate a difference between each binary value and a reference value.

If the color expression gamut is defined using the color primary other than RGB, the color_primary_y[i] field may indicate y coordinates in the color space of the i-th color primary. The color_primary_y[i] field may indicate a binary value of each value interposed between '0' and '1', and may indicate a difference between each binary value and a reference value.

The white_primary_x field may indicate x coordinates of W (white) color in the color space. The white_primary_x field may indicate a binary value of each value interposed between '0' and '1', and may indicate a difference between each binary value and a reference value.

The white_primary_y field may indicate y coordinates of W color in the color space. The white_primary_y field may indicate a binary value of each value interposed between '0' and '1', and may indicate a difference between each binary value and a reference value.

FIG. 9 is a view illustrating 'general_color_primaries( )' according to an embodiment of the present invention.

Referring to FIG. 9, the gamut_resampling_info( ) field according to one embodiment may have a descriptor format, and may be contained in gamut_resampling_info(payloadsize).

The gamut_resampling_info( ) field may include a color_space_type field, an RGB_to_XYZ_mapping_function_flag field, an XYZ_to_RGBprime_mapping_function_flag field, a number_of_coeff field, an RGB_XYZ_mapping_function_coeff[i] field, an XYZ_to_RGBprime_mapping_function_coeff[i] field, a gamut_resampling_function_coeff[i] field, an LUT_type field, and/or an LUT_info( ) field.

The color_space_type field may indicate an arbitrary color space used in the gamut resampling. A detailed description of field values contained in the color_space_type field is as follows.

If the RGB_to_XYZ_mapping_function_flag field is set to 1, this field indicates that elements of the mapping function for converting RGB values based on a current color gamut into XYZ values are directly signaled. If the RGB_to_XYZ_mapping_function_flag field is set to zero '0', this field may indicate that a predetermined value is used for a given color_space_type and is judged by inference and then mapped. In accordance with one embodiment, this field may also be used to represent the mapping function regarding YCbCr~XYZ colors instead of RGB~XYZ colors, or the mapping functions regarding the remaining colors other than YCbCr~XYZ and RGB~XYZ colors.

If the XYZ_to_RGBprime_mapping_function_flag field is set to 1, this field may indicate that elements of the mapping function for converting XYZ values into RGB values based on a target color gamut are directly signaled. If the XYZ_to_RGBprime_mapping_function_flag field is set to zero '0', this field may indicate that a predetermined value is used for a given color_space_type or is judged by inference and then mapped. In accordance with one embodiment, this field may also be used to represent the mapping functions regarding YCbCr~XYZ colors instead of RGB~XYZ colors, or the mapping functions regarding the remaining colors other than YCbCr~XYZ and RGB~XYZ colors.

The number_of_coeff field (present in RGB_to_XYZ_mapping_function_flag loop) may indicate the number of elements (coefficients) of the mapping function for converting RGB values based on the current color gamut into XYZ values.

The RGB_XYZ_mapping_function_coeff[i] field may indicate the elements of the mapping function for converting RGB values based on the current color gamut into XYZ values. In accordance with one embodiment, it is assumed that such conversion is achieved through a linear matrix, and each element may construct a single conversion equation as shown in the following drawings.

The number_of_coeff field (present in XYZ_to_RGBprime_mapping_function_flag loop) may indicate the number of elements of the mapping function for converting a color denoted by XYZ values in the color space into RGB values based on the target color gamut.

The XYZ_to_RGBprime_mapping_function_coeff[i] field may indicate the elements of the mapping function for converting a color denoted by XYZ values in the color space into RGB values based on the target color gamut. In accordance with one embodiment, it is assumed that such conversion is achieved through the linear matrix, and each element may construct a single conversion equation as shown in the following drawings.

The number_of_coeff field (present in gamut_resampling_type=='0010' loop) may indicate the number of elements of the mapping function for converting RGB values based on the current color gamut into R'G'B' values based on the target color gamut, according to the single conversion equation.

The gamut_resampling_function_coeff[i] field may indicate the number of elements of the mapping function for converting RGB values based on the current color gamut into R'G'B' values based on the target color gamut, according to the single conversion equation. In accordance with one embodiment, the gamut_resampling_function_coeff[i] field may be used when the receiver uses conversion supplied from the content provider without change and without additional processing therein. In accordance with one embodiment, it is assumed that such conversion is achieved through the linear matrix, and each element may construct a single conversion equation as shown in the following drawings.

The LUT_type field may indicate the category of LUT when the gamut_resampling_type field is set to '0011'. LUT according to one embodiment may be a single method for color mapping, and may indicate a table for matching the input value to the output value on a one to one basis. A detailed description of the LUT_type field is as follows.

The LUT_info( ) field may include constituent elements of LUT according to the above-mentioned LUT_type.

FIG. 10 is a view illustrating 'container_color_gamut_type' according to an embodiment of the present invention.

Referring to FIG. 10, the container_color_gamut_type field according to one embodiment may be contained in the gamut_resampling_info(payloadsize) field.

If the container_color_gamut_type is set to 0000, this means that the color gamut is identical to BT.601. If the container_color_gamut_type is set to 0001, this means that the color gamut is identical to BT.709. If the container_color_gamut_type is set to 0010, this means that the color gamut is identical to DCI-P3. If the container_color_gamut_type is set to 0011, this means that the color gamut is identical to BT.2020 (NCL). If the container_color_gamut_type is set to 0100, this means that the color gamut is identical to BT.2020 (CL). If the container_color_gamut_type is set to 0101, this means that the color gamut is identical to XYZ. If the container_color_gamut_type is set to 0110, this means that the color gamut is based on user definition.

FIG. 11 is a view illustrating a field 'content_color_gamut_type' according to an embodiment of the present invention.

Referring to FIG. 11, the content_color_gamut_type field may be contained in the gamut_resampling_info(payloadsize) field.

If the content_color_gamut_type is set to 0000, this means that the color gamut is identical to BT.601. If the content_color_gamut_type is set to 0001, this means that the color gamut is identical to BT.709. If the content_color_gamut_type is set to 0010, this means that the color gamut is identical to DCI-P3. If the content_color_gamut_type is set to 0011, this means that the color gamut is identical to BT.2020 (NCL). If the content_color_gamut_type is set to 0100, this means that the color gamut is identical to BT.2020 (CL). If the content_color_gamut_type is set to 0101, this means that the color gamut is identical to XYZ. If the container_color_gamut_type is set to 0110, this means that the color gamut is based on user definition.

FIG. 12 is a view illustrating 'gamut_resampling_type' according to an embodiment of the present invention.

Referring to FIG. 12, the gamut_resampling_type field may be contained in the gamut_resampling_info(payloadsize) field.

If the gamut_resampling_type field is set to 0000, the receiver may perform gamut resampling using the receiver-inference method or the promised method (pre-defined gamut resampling) on the basis of the color gamut and the content color gamut information. If the gamut_resampling_type field is set to 0000 to 0011, the receiver may perform gamut resampling using the method defined in the above-mentioned gamut_resampling_info( ) field. If the gamut_resampling_type field is set to 0001 (gamut resampling functions), the receiver may divide the gamut resampling into two steps (RGB to XYZ and XYZ to RGB), and may perform gamut resampling using the mapping function regarding each step. In this case, the color space indicating XYZ may be designated.

If the gamut_resampling_type field is set to 0010 (single function conversion), the receiver may perform gamut resampling using a method for expressing the entire process as an arbitrary matrix and transmitting the resultant matrix. In accordance with one embodiment, the receiver may perform gamut resampling for converting RGB values based on the current color gamut into R'G'B' values based on a new color gamut without the intermediate XYZ conversion.

If the gamut_resampling_type field is set to 0011 (Look Up Table), the receiver may perform gamut resampling using the received LUT (Look Up Table).

In accordance with one embodiment, if the gamut_resampling_type field is set to 0001, instead of 0010 or 0011, the conversion equation from RGB to XYZ and the other conversion equation from XYZ to RGB are given. As described above, the respective conversion equations are transferred through separate processes, such that the receiver may add the proper image enhancement to each step, resulting in acquisition of higher-definition images.

FIG. 13 is a view illustrating 'color_space_type' according to an embodiment of the present invention.

Referring to FIG. 13, the color_space_type field may be contained in the gamut_resampling_info( ) field.

If the color_space_type is set to 0000, this means that the CIE 1931 color space is used in the gamut resampling.

If the color_space_type is set to 0001, this means that the CIE Lab color space is used in the gamut resampling.

If the color_space_type is set to 0010, this means that the CIE Luv color space is used in the gamut resampling.

FIG. 14 is a view illustrating a conversion equation according to a mapping function that converts RGB values based on the current color gamut into XYZ values during the gamut resampling process according to an embodiment of the present invention.

Referring to FIG. 14, according to one embodiment, RGB values based on the current color gamut may be converted into XYZ values using the matrix conversion equation.

FIG. 15 is a view illustrating a conversion equation according to a mapping function that converts a color denoted by XYZ values into RGB values based on a target color gamut during a gamut resampling process according to an embodiment of the present invention.

Referring to FIG. 15, according to one embodiment, the color denoted by XYZ values may be converted into RGB values based on the target color gamut using the matrix conversion equation.

FIG. 16 is a view illustrating a conversion equation according to a mapping function that converts RGB values based on a current color gamut for use in a single conversion equation into R'G'B' values based on a target color gamut according to an embodiment of the present invention.

Referring to FIG. 16, according to one embodiment, RGB values based on the current color gamut may be converted into R'G'B' values based on the target color gamut using the matrix conversion equation.

FIG. 17 is a view illustrating 'LUT_type' according to an embodiment of the present invention.

According to one embodiment, the LUT for matching an input value to an output value in association with all colors has a huge amount of data, and it may be difficult for the LUT to be transmitted in the form of metadata. Accordingly, according to one embodiment, 3D coordinates of the color are not all used, and a method for independently matching the 3D coordinates to each channel, or a method for estimating LUT constituent elements on the basis of a reference point may be used.

If the LUT_type field is set to 0000, this means that LUT configured to be independently matched to each channel is used. If the LUT_type field is set to 0001, this means that LUT configured to use all the 3D coordinates is used. If the LUT_type field is set to 0010, this means that LUE configured to estimate LUT constituent elements on the basis of a reference point may be used.

FIG. 18 is a view illustrating a Program Map Table (PMT) according to an embodiment of the present invention.

Referring to FIG. 18, according to one embodiment, for the UHD service using the above-mentioned gamut_resampling_info(payloadsize), metadata transmission through the SEI message and/or signaling for UHD service in PMT may be needed. Furthermore, according to one embodiment to be described later, the UHD service and/or the gamut_resampling_info(payloadsize) field may be signaled at the service level using Event Information Table (EIT).

PMT according to one embodiment may include a table_id field, a section_syntax_indicator field, a section_length field, a program_number field, a version_number field, a current_next_indicator field, a section_number field, a last_section_number field, a PCR_PID field, a program_info_length field, a descriptor( ) field, a stream_type field, an elementary_PID field, an ES_info_length field, a descriptor( ) field, and/or a CRC_32 field.

The table_id field may identify the type of the table. The table_id field may indicate that the corresponding table section is a section constructing the PMT.

The section_syntax_indicator may indicate the format of a table section located after the corresponding field. If the corresponding field is set to zero '0', this means that the corresponding table section is a short format. If the corresponding field is set to '1', this means that the corresponding table section is based on a general long format.

The section_length field may indicate the length of the corresponding table section. The section_length field indicates the length ranging from the corresponding field to the end of the corresponding table section, such that the actual length of the corresponding table section may indicate that the actual length of the corresponding table section is achieved by adding 3 bytes to the value denoted by the section_length field.

The program_number field may identify each program service or virtual channel present in the transport stream.

The version_number field may indicate a version number of the private table section. The receiver may search for the latest one from among table sections stored in the memory using the version_number field and the current_next_indicator field.

If the current_next_indicator field is set to 1, this means that a current transmission table is valid. If the current_next_indicator field is set to 0, this means that the current transmission table will be valid in future although it is not valid at present.

The section_number field may indicate the order of arrangement of the corresponding section within the corresponding table, such that the arrangement order of the corresponding section within the table can be recognized.

The last_section_number field may indicate the order of the last section from among the plurality of sections constructing the corresponding table.

PCR_PID field may indicate a packet ID including a Program Clock Reference (PCR) for the program service.

The program_info_length field may indicate the length of a descriptor indicating the subsequent program information (program_info).

The descriptor( ) field may indicate a descriptor indicating information regarding the program corresponding to the table section. In accordance with one embodiment, this descriptor( ) field may include 'UHD_program_info_descriptor( )' for identifying the UHD service type.

The stream_type field may indicate the type of each unit stream constructing the program explained by the corresponding table.

The elementary_PID field may indicate the packet ID of each unit stream constructing the program explained by the corresponding table.

The ES_info_length field may indicate the length of a descriptor indicating information (ES_info) for each unit stream to be followed in a subsequent order.

The descriptor( ) field may indicate a descriptor indicating information of a single unit stream from among unit streams constructing the program explained by the corresponding table. In accordance with one embodiment, this descriptor may include a descriptor including the above-mentioned gamut_resampling_info(payloadsize) and/or another descriptor including the above-mentioned gamut_resampling_info( ).

The CRC_32 field may indicate a CRC value for determining the presence or absence of an error in data contained in the corresponding table section.

The PMT according to one embodiment may be transmitted in the in-band manner through MPEG-TS, and the entirety of PSI information including the PMT may be written in the xml languages and transmitted through the IP.

FIG. 19 is a view illustrating a field 'UHD_program_info_descriptor( )' according to an embodiment of the present invention.

Referring to FIG. 19, the UHD_program_info_descriptor( ) field according to one embodiment may include a descriptor_tag field, a descriptor_length field, and/or a UHD_service_type field.

The descriptor_tag field may indicate that this descriptor is a descriptor including type information of the UHD service.

The descriptor_length field may indicate the length of this descriptor.

The UHD_service_type field may provide information regarding the UHD service type. A detailed description of the field value assigned to this field will hereinafter be given.

FIG. 20 is a view illustrating a field 'UHD_service_type' according to an embodiment of the present invention.

Referring to FIG. 20, the UHD_service_type according to one embodiment may be contained in the above-mentioned UHD_program_info_descriptor( ).

If the UHD_service_type is set to 0000, this means that the provision service is a UHD1 (4K) service.

If the UHD_service_type is set to 0001, this means that the provision service is a UHD2 (8K) service.

The UHD_service_types (1000 to 1111) may be defined by the user and then used. In accordance with one embodiment, the UHD_service_type may be used to indicate the services sectioned according to UHD services. In accordance with one embodiment, if the UHD_service_type field is set to 1010, this means the UHD1 service based on the gamut resampling.

FIG. 21 is a view illustrating an Event information Table (EIT) according to an embodiment of the present invention.

Referring to FIG. 21, according to one embodiment, the UHD service and/or the gamut_resampling_info(payloadsize) may be signaled using the Event information Table (EIT).

The EIT field according to one embodiment may include a table_id field, a section_syntax_indicator field, a section_length field, a service_id field, a version_number field, a current_next_indicator field, a section_number field, a last_section_number field, a transport_stream_id field, an original_network_id field, a segment_last_section_number field, a last_table_id field, an event_id field, a start_time field, a duration field, a running_status field, a free_CA_mode field, a descriptors_loop_length field, a descriptor( ) field, and/or a CRC_32 field.

The table_id field may identify the table type. The table_id field may indicate that the corresponding table section is a section constructing the EIT.

The section_syntax_indicator field may indicate the format of a table section subsequent to the corresponding field. If the corresponding field is set to zero '0', the corresponding table section may indicate a short format. If the corresponding field value is set to 1, the corresponding table section may be based on a general long format.

The section_length field may indicate the length of the corresponding table section. The section_length field may indicate the length from the rear part of the corresponding field to the end of the corresponding table section.

The service_id field may identify each service present in the transport stream. The service_id field may have the same function as in the program_number field in PMT.

The version_number field may indicate a version number of a private table section. The receiver may search for the latest one from among table sections stored in the memory using the current_next_indicator field to be described later.

If the current_next_indicator field is set to 1, this means that the current transmission table is valid. If the current_next_indicator field is set to zero '0', this means that the current transmission table will be valid in future although it is not valid at present.

The section_number field may indicate the order of arrangement of the corresponding section within the corresponding table, such that the arrangement order of the corresponding section within the table can be recognized.

The last_section_number field may indicate the order of the last section from among the plurality of sections constructing the corresponding table.

The transport_stream_id field may identify a transport stream (TS) to be described in the corresponding table.

The original_network_id field may identify an optimum broadcast station having transmitted the service or event described in the corresponding table.

The segment_last_section_number field may indicate the last section number of the corresponding segment when the sub table is present. If the sub table is not divided into a plurality of sections, the value denoted by the corresponding field may indicate the same value as in the last_section_number field.

The last_table_id field may indicate the last table_id used.

The event_id field may identify each event, and may have only one value within only one service.

The start_time field may indicate a start time of the corresponding event.

The duration field may indicate a duration time of the corresponding event. For example, if the duration time of the program is 105 minutes and 30 seconds, the duration field may indicate '0x014530'.

The running_status field may indicate a status of the corresponding event 다.

If the free_CA_mode field is set to zero '0', this means that the component streams constructing the service are not scrambled. If the free_CA_mode field is set to '1', this means that access to one or more streams is adjusted by the CA system. CA system is an abbreviation of Conditional Access System. The CA system may allow only a contractor to legally view and listen to the broadcast program, and may have a function for encoding (encrypting) the broadcast content and may allow only the contractor to decode (or decrypt) a password such that the contractor can view and listen to the broadcast content.

The descriptors_loop_length field may indicate the sum of lengths of descriptors located subsequent to the corresponding field.

The descriptor( ) field may indicate a descriptor for describing each event. In accordance with one embodiment, this descriptor may include a UHD_program_info_descriptor( ) indicating the UHD service type and/or a descriptor including gamut_resampling_info(payloadsize). In this case, through the descriptor including the above-mentioned gamut_resampling_info(payloadsize), it can be recognized whether or not metadata for conversion of the color gamut is included in the event level, and the receiver may determine whether or not the content based on the corresponding color gamut is accommodated. In accordance with one embodiment, the above-mentioned information contained in this descriptor may be contained in AEIT in the case of cable broadcasting.

The CRC_32 field may indicate a CRC value used to determine the presence or absence of an error in data contained in the corresponding table section.

In accordance with one embodiment, EIT may be configured in the form of a table and then transmitted to the TS, and may be written in xml and then transmitted by IP streaming.

In accordance with one embodiment, if UHD_service_type contained in the UHD_program_info_descriptor( ) of the EIT is set to 1010 (indicating UHD1 (4K) service based on gamut resampling), it can be recognized that gamut resampling can be performed using metadata.

In accordance with another embodiment, if UHD_service_type contained in UHD_program_info_descriptor( ) of the EIT is set to 0000 (indicting UHD1 (4K) service), the presence or absence of a descriptor including the gamut_resampling_info(payloadsize) field is confirmed, such that gamut resampling can be carried out using metadata.

FIG. 22 is a view illustrating 'gamut_resampling_info_descriptor( )' according to an embodiment of the present invention.

Referring to FIG. 22, according to one embodiment, the gamut_resampling_info_descriptor( ) field may be identical to the descriptor including the above-mentioned gamut_resampling_info(payloadsize).

The gamut_resampling_info_descriptor( ) field may include a descriptor_tag field, a descriptor_length field, and/or a gamut_resampling_metadata( ) field.

The descriptor_tag field may indicate that this descriptor includes gamut_resampling_metadata( ).

The descriptor_length field may indicate the length of the descriptor.

The gamut_resampling_metadata( ) field may include information related to the gamut resampling, and a detailed description thereof is as follows.

In accordance with one embodiment, if the gamut resampling related information is transmitted through gamut_resampling_info_descriptor( ) in the EIT, the container color gamut and/or the content color gamut are transmitted, such that information as to whether the program to be transmitted in future is received and information as to whether the program to be transmitted in future is operated will be determined in advance.

FIG. 23 is a view illustrating 'gamut_resampling_metadata( )' according to an embodiment of the present invention.

Referring to FIG. 23, the gamut_resampling_metadata( ) field may be identical to gamut_resampling_info(payloadsize).

In accordance with one embodiment, the gamut_resampling_metadata( ) field may include a container_color_gamut_type field, a content_color_gamut_type field, a general_color_primaries( ) field, and/or a gamut_resampling_type field. Although not shown in FIG. 23, the gamut_resampling_metadata( ) field may further include gamut_resampling_info( ).

From among the fields contained in the gamut_resampling_metadata( ) field, the same field as the field including the above-mentioned gamut_resampling_info(payload) may have the same meaning as in the field contained in the gamut_resampling_info(payload).

In accordance with one embodiment, the gamut_resampling_metadata( ) field may have the same meaning as in gamut_resampling_metadata(payloadsize).

Figure 24:
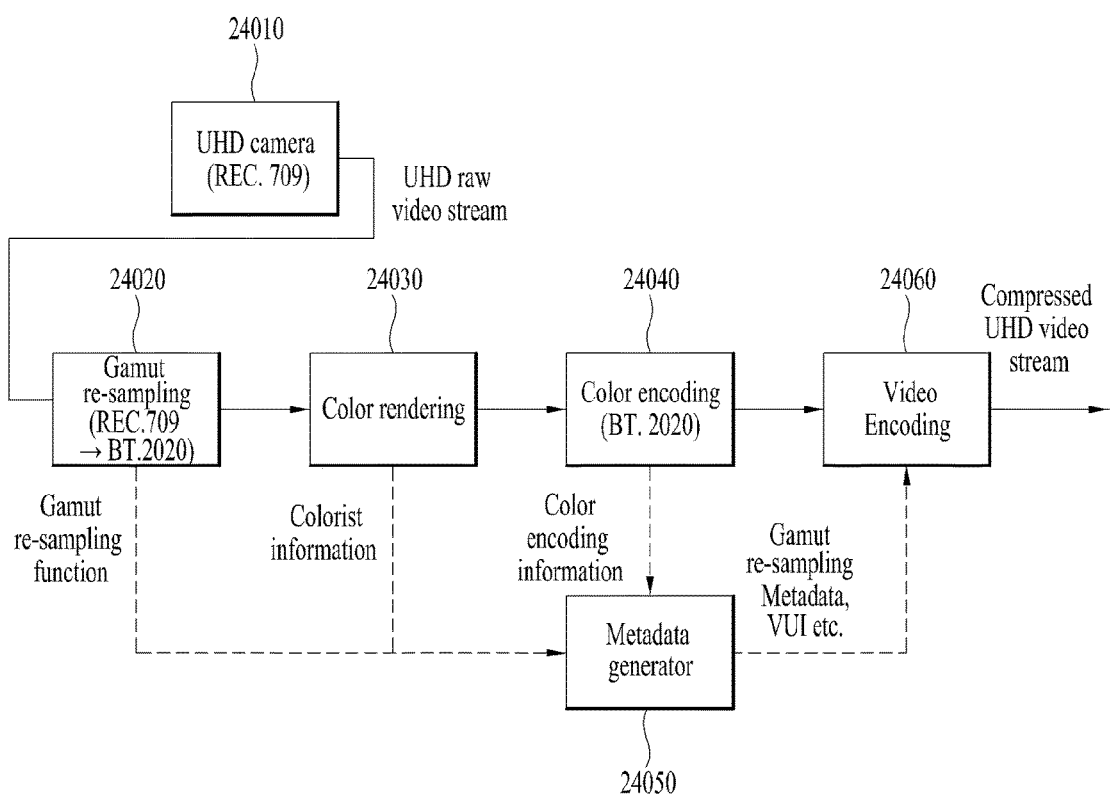
FIG. 24 is a conceptual diagram illustrating the operations of a transmitter according to an embodiment of the present invention.

FIG. 24 is a conceptual diagram illustrating the operations of a transmitter according to an embodiment of the present invention.

The operations of the transmitter for converting video data acquired by the UHD camera based on a small color gamut (e.g., REC.709) into a color based on a wide color gamut (e.g., BT.2020) are shown in FIG. 24.

The operation of the transmitter according to one embodiment may include a UHD camera process 24010, a gamut resampling process 24020, a color rendering process 24030, a color encoding process 24040, a metadata generator process 24050, and/or a video encoding process 24060.

In the UHD camera process 24010, the embodiment of the present invention may acquire video data acquired by the UHD camera having REC. 709 color gamut.

In the gamut resampling process 24020, in association with video data acquired by the UHD camera having REC.709 color gamut, the transmitter may convert the REC.709 color gamut to which the above video data is applied into the BT.2020 color gamut having a color expression gamut. The converted BT.2020 color gamut may indicate a color gamut of the target display when the images are reproduced by the final receiver. In accordance with one embodiment, inverse conversion related information for the conversion used in the above process may be constructed in the form of metadata, and then transmitted to the receiver.

The above-mentioned inverse conversion related information may be used for the legacy display that does not sufficiently satisfy the color gamut (BT.2020) of the target display. The above-mentioned process may be carried out by the color gamut resampling process according to an embodiment of the present invention.

In the color rendering process 24030, the content in which the color gamut is changed by the previous process may pass through the image correction and/or editing process performed at the studio/content provider/production stage. This process may be performed after completion of the gamut resampling process, and video related information generated in this process may be transmitted to the colorist metadata (colorist information). The above-mentioned process may be carried out by the color gamut resampling process.

In the color encoding process 24040, the transmitter may convert RGB values into YCbCr values so as to transmit color images. In this case, such conversion may be carried out on the basis of the BT.2020 color gamut converted by the above-mentioned gamut resampling. In accordance with one embodiment, the RGB to YCbCr conversion information and/or color gamut information may be transmitted in the form of video metadata (such as VUI). The above-mentioned information may be contained in the color encoding information. This process may be carried out by the encoder according to one embodiment.

The metadata generator process 24050 may generate metadata, which includes inverse conversion information (gamut resampling function) regarding conversion used in the gamut resampling generated in the gamut resampling process 24020, colorist information generated in the color rendering process 24030, RGB to YCbCr conversion information generated in the color encoding process 24040, and/or color encoding information including color gamut information. In accordance with one embodiment, through the above-mentioned process, gamut re-sampling metadata, VUI, etc. may be generated. This process may be carried out by the signaling information generator according to one embodiment.

In the video encoding process 24060, the transmitter may perform data compression using a video codec for transmission of UHD images. In accordance with one embodiment, gamut re-sampling metadata and image quality related metadata including VUI or the like may be contained in video sources. The above-mentioned process may be carried out by the encoder according to one embodiment.

REC.709 and BT.2020 may correspond to one embodiment of the present invention, and another color gamut of another standard may be used as necessary.

Figure 25:
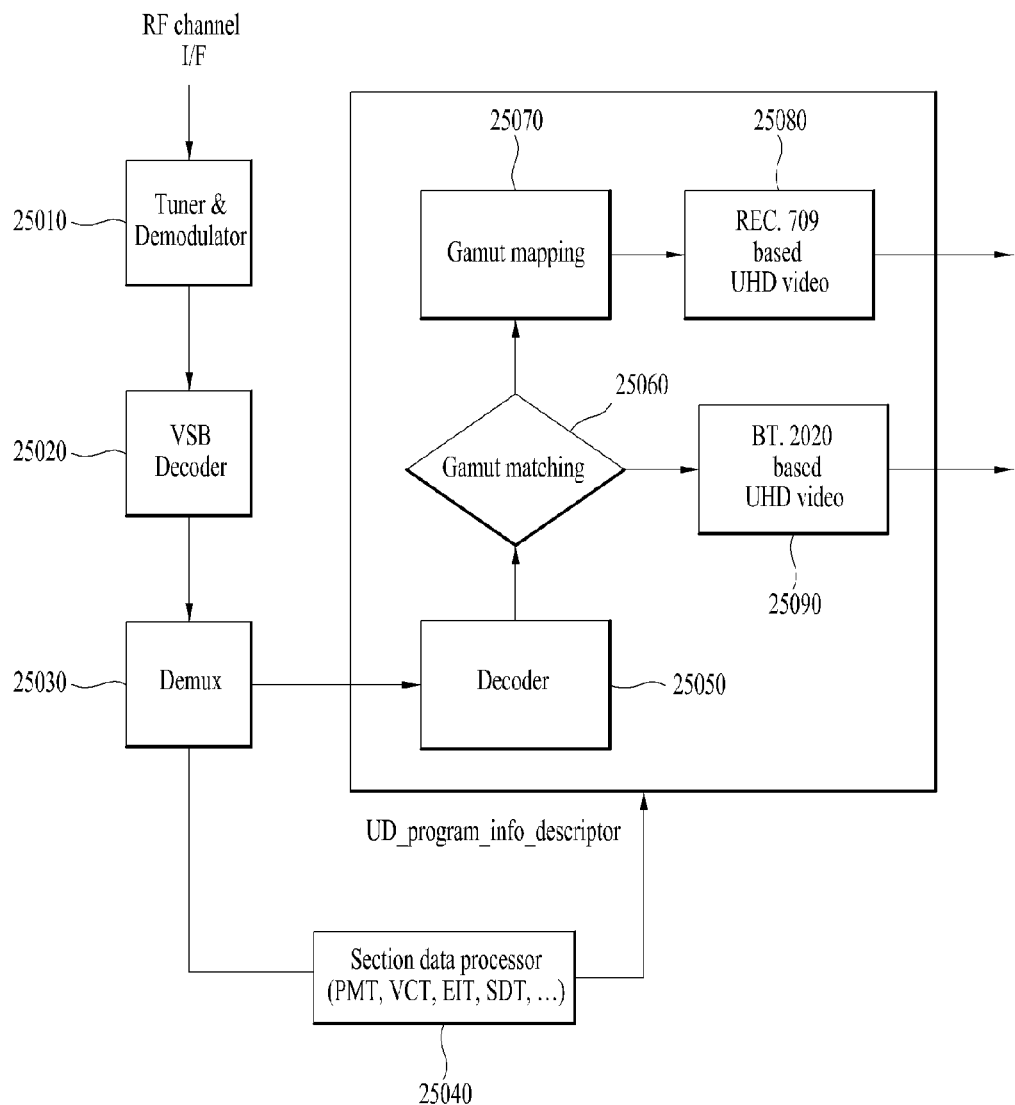
FIG. 25 is a conceptual diagram illustrating a receiver and operations of the receiver according to an embodiment of the present invention.

FIG. 25 is a conceptual diagram illustrating a receiver and operations of the receiver according to an embodiment of the present invention.

Referring to FIG. 25, if WCG video is transmitted according to one embodiment, the receiver may analyze signals and may output images through gamut resampling, and as such a detailed description thereof is as follows.

The receiver according to one embodiment may recognize the presence or absence of a separate service or media to be additionally received, so as to construct the original UHDTV broadcasting using UHD_program_info_descriptor of the received PMT. If UHD_service_type contained in UHD_program_info_descriptor is set to 1010, the receiver may recognize the presence or absence of additional information to be transmitted through the SEI message. Alternatively, if UHD_service_type contained in UHD_program_info_descriptor is set to 0000 or 0001, the receiver may recognize the presence of additional information transmitted through EIT.

In accordance with one embodiment, the color gamut may be determined on the basis of the color gamut information contained in VUI. If the color gamut contained in VUI can be displayed on the display of the receiver, the receiver may perform post-processing of the video, and may finally display the content. In contrast, assuming that color gamut information contained in VUI exceeds the color expression gamut capable of being displayed on the display, one embodiment of the present invention may recognize the color gamut expressed by the real content using the additional information transmitted through the SEI message or EIT, and may convert the color gamut to be appropriate for display.

One embodiment of the present invention may receive color gamut information of the real content, color gamut information (container color gamut information) needed to perform color encoding, and/or the gamut resampling information.

Through the SEI message including gamut_resampling_info(payloadsize) or through gamut_resampling_info_descriptor of the EIT, color gamut information of the actual content, the color gamut information (container color gamut information) needed for color encoding, and/or gamut resampling information may be received. In accordance with one embodiment, if the color gamut of the content is in the range appropriate for the display, and/or if the gamut resampling method denoted by the gamut_resampling_type can be processed by the receiver, gamut resampling may be carried out. In this case, the receiver may directly process the function that converts container_color_gamut_type into content_color_gamut_type according to gamut_resampling_type, or may convert the color gamut using the coefficient of a function directly transmitted by a manufacturer. In accordance with one embodiment, the receiver may perform color enhancement processing to improve the sensor of color during the gamut resampling process. In accordance with one embodiment, if content_color_gamut_type has a wider gamut as compared to the color gamut of the display, the received content may be determined to be a WCG content, and the same effect as in the clipping can be achieved by applying the gamut resampling to the WCG content. Alternatively, one embodiment of the present invention can perform a separate operation for properly expressing the WCG content on the legacy display.

In accordance with one embodiment, the receiver may perform bit depth quantization process for each pixel value of the content image in which the color gamut is converted. The bit depth quantization process may be carried out to properly express the content within the bit depth of the display of the receiver. In addition, the bit depth quantization process may be interoperable with the tone mapping corresponding to the video post-processing step and/or may be interoperable with the transfer curve.

In accordance with one embodiment, the receiver may output superior-quality images having improved luminance or higher sense of color through video post-processing prior to final display of the content. In accordance with one embodiment, content_color_gamut_type contained in the SEI message or color primary values of RGBW may be used.

The receiver according to one embodiment may include a tuner and demodulator 25010, a VSB decoder 25020, a demultiplexer (demux) 25030, a section data processor 25040, a decoder 25050, a gamut matching unit 25060, and/or a gamut mapping unit 25070.

The tuner and demodulator 25010 may receive a broadcast signal from the transmitter, and may demodulate the received broadcast signal. In accordance with one embodiment, UHD video or UHD video based on gamut resampling may be contained in the broadcast signal.

The VSB decoder 25020 may decode the VSB-modulated broadcast signal.

The demultiplexer (demux) 25030 may extract video data, audio data, and signaling data contained in the multiplexed broadcast signal.

The section data processor 25040 may parse and/or process the section data extracted from the demultiplexer 25030. In accordance with one embodiment, the section data may include a program map table (PMT), a virtual channel table (VCT), an event information table (EIT), a service description table (SDT), etc.

The decoder 25050 may decode video or audio data extracted from the demultiplexer (demux) 25030.

The gamut matching unit 25060 may compare the color gamut of the container received through the VUI or SEI message with the color gamut of the display. In this case, colour_primaries defined in VUI or the above-mentioned container_color_gamut_type may be used. If the receiver does not express the color gamut of the received container, that is, if the display of the receiver is determined to be the legacy display, the receiver may convert the received image into images appropriate for the legacy display of the receiver through additional processing. If the container color gamut can be expressed on the display, the content may correspond to UHD video 25090 based on BT.2020.

The gamut mapping unit 25070 may re-display content expressed as the WCG to support a WCG display as an original color expression gamut. A detailed description thereof has already been given. In accordance with one embodiment, the content in which the color gamut is converted may correspond to the UHD video 25080 based on REC.709.

Figure 26:
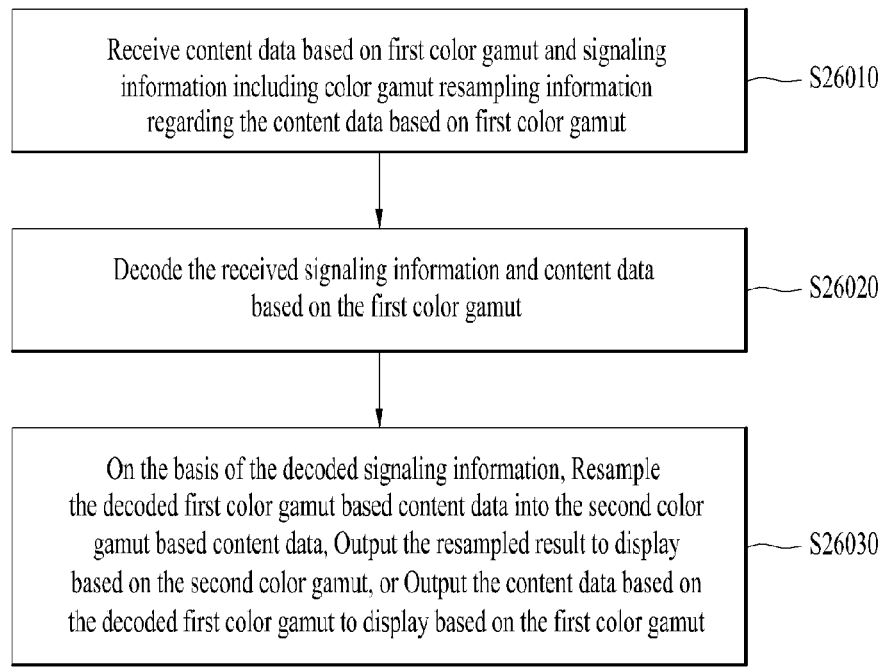
FIG. 26 is a flowchart illustrating a method for receiving a broadcast signal according to an embodiment of the present invention.

FIG. 26 is a flowchart illustrating a method for receiving a broadcast signal according to an embodiment of the present invention.

One embodiment of the present invention may receive a broadcast signal through the following process. The receiver according to one embodiment may receive signaling information including both the content data based on the first color gamut and the color gamut resampling information regarding the first color gamut based content data (S26010). The first color gamut and the second color gamut used in the receiver according to one embodiment may have another meaning different from the first and second color gamuts used in the transmitter. From the viewpoint of the receiver according to one embodiment, the first color gamut for use in the receiver may indicate a container color gamut, may indicate the color gamut based on editing of the content data and/or the color gamut based on the transmission format. The second color gamut may indicate the color gamut of the original content or the color gamut of the display. In contrast, the first color gamut used in the transmitter according to one embodiment may indicate the color gamut of the original content, and the second color gamut may indicate the color gamut of the container. Accordingly, from the viewpoint of the receiver according to one embodiment, the first color gamut may indicate the BT.2020 color gamut, and the second color gamut may indicate REC. 709 color gamut. A detailed description thereof has already been given with reference to FIGS. 2, 3, 4, 6, 7, and 25. The receiver according to one embodiment may decode each of the received signaling information and the content data based on the first color gamut (S26020). A detailed description thereof has already been given with reference to FIGS. 3, 4, 6, 7, and 25. Thereafter, the receiver according to one embodiment may resample the content data based on the first color gamut into content data based on the second color gamut on the basis of the decoded signaling information so as to output the resampled resultant data on the display based on the second color gamut, or the content data based on the decoded first color gamut may be output to the display based on the first color gamut (S26030). The display based on the second color gamut may be referred to as a legacy display, or may indicate the display based on REC.709 color gamut. The display based on the second color gamut may indicate the display capable of displaying the WCG, or may indicate the display based on BT.2020 color gamut. A detailed description thereof has already been given with reference to FIGS. 3, 4, and 25.

In accordance with another embodiment, the above-mentioned color gamut resampling information may include information regarding the first color gamut, information regarding the second color gamut, the color gamut resampling type information indicating the resampling scheme, and/or detailed information of the color gamut resampling type according to the color gamut resampling type information. In accordance with on embodiment, information regarding the first color gamut for use in the receiver may include container_color_gamut_type and/or general_color_primaries( ). Information regarding the second color gamut may include content_color_gamut_type and/or general_color_primaries( ). The color gamut resampling type information according to one embodiment may indicate gamut_resampling_type, and detailed information of the color gamut resampling type may indicate gamut_resampling_info( ). A detailed description thereof has already been given with reference to FIGS. 6 to 17.

In accordance with another embodiment, the first color gamut information may include information regarding the first color gamut type and/or the coordinate information in a color space of a reference color for defining the first color gamut when the first color gamut is not identical to the legacy defined color gamut. The second color gamut information may include information regarding the second color gamut type and/or the coordinate information in a color space of a reference color for defining the second color gamut when the second color gamut is not identical to the legacy defined color gamut. The color gamut according to one embodiment may correspond to the color gamut defined as the legacy standard, and may correspond to the arbitrarily defined color gamut. Differently from the receiver according to one embodiment, information indicating the type of the first color gamut may indicate container_color_gamut_type, and the coordinate information in a color space of a reference color for defining the first color gamut instead of the legacy defined color gamut may indicate coordinate information contained in general_color_primaries( ). From the viewpoint of the receiver according to one embodiment, information indicating the type of the second color gamut may indicate content_color_gamut_type. If the second color gamut is not identical to the legacy defined color gamut, and the coordinate information in the color space of a reference color for defining the second color gamut may indicate coordinate information contained in general_color_primaries( ). A detailed description thereof has already been given with reference to FIGS. 7 and 8.

In accordance with another embodiment, assuming that the resampling scheme based on the color gamut resampling type information is the scheme in which content data based on the first color gamut is a neutral color space value not affected by the color gamut, and the converted neutral color space value is converted into the content data based on the second color gamut, detailed information of the color gamut resampling type may include information indicating the neutral color space type, coefficient information of the conversion equation for converting the content data based on the first color gamut into a neutral color space value, and/or coefficient information of the conversion equation for converting the converted neutral color space value into the content data based on the second color gamut. Information indicating the neutral color space type according to one embodiment may indicate color_space_type. The coefficient information of the conversion equation for converting the content data based on the first color gamut into a neutral color space value may indicate RGB_XYZ_mapping_function_coeff[i], and the coefficient information of the conversion equation for converting the converted neutral color space value into the content data based on the second color gamut may indicate XYZ_to_RGBprime_mapping_function_coeff[i]. A detailed description thereof has already been given with reference to FIGS. 7 and 9.

In accordance with another embodiment, assuming that the resampling scheme based on the color gamut resampling type information is the scheme for directly converting the content data based on the first color gamut into the content data based on the second color gamut, detailed information of the color gamut resampling type may include coefficient information of the conversion equation for converting the content data based on the first color gamut into the content data based on the second color gamut. Assuming that the resampling scheme based on the color gamut resampling type information is the scheme for using the lookup table (LUT) indicating mapping information between the content data based on the first color gamut and the content data based on the second color gamut, detailed information of the color gamut resampling type may include the type information of the lookup table (LUT) and constituent element information of the lookup table (LUT). In accordance with detailed information of the color gamut resampling type, the coefficient information of the conversion equation for converting the content data based on the first color gamut into content data based on the second color gamut may indicate gamut_resampling_function_coeff[i], and type information of the lookup table may indicate LUT_type, and the constituent element information of the lookup table (LUT) may indicate LUT_info( ). A detailed description thereof has already been given with reference to FIGS. 7 and 9.

In accordance with another embodiment, the signaling information may include a Program Map Table (PMT), an Event Information Table (EIT), a Video Usability Information (VUI) message, and/or a Supplemental Enhancement Information (SEI) message. At least one of PMT and EIT according to one embodiment may include specific information for identifying that the broadcast service contained in the transmitted broadcast signal is identical to the broadcast service based on the color gamut resampling. A detailed description thereof has already been given with reference to FIGS. 6, 18, 19, 20, and 21.

In accordance with another embodiment, the color gamut resampling information may be contained in at least one of PMT, EIT, VUI, and SEI messages. A detailed description thereof has already been given with reference to FIGS. 6, 7, 18, 19, 20, 21, 22, and 23.

Figure 27:
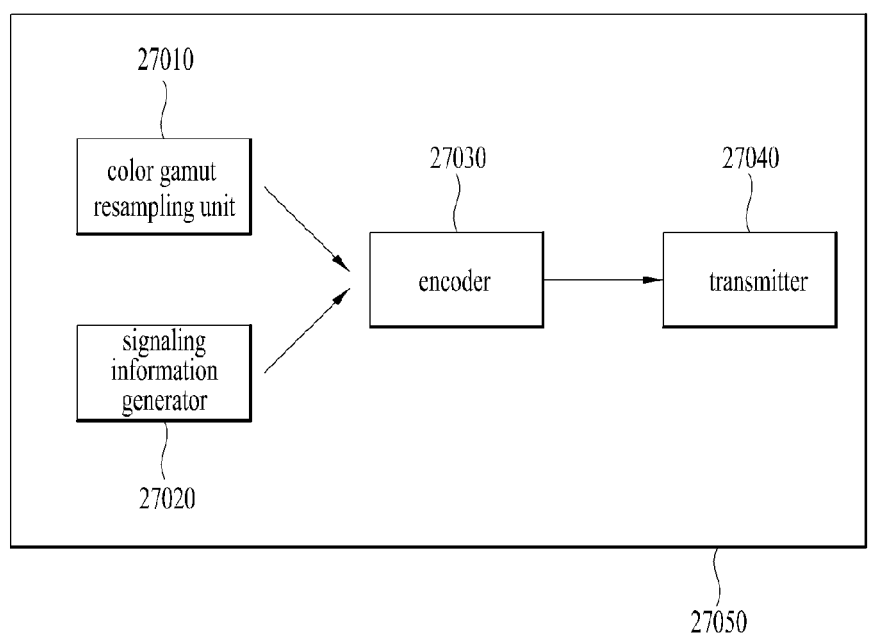
FIG. 27 is a block diagram illustrating an apparatus for transmitting a broadcast signal according to an embodiment of the present invention.

FIG. 27 is a block diagram illustrating an apparatus for transmitting a broadcast signal according to an embodiment of the present invention.

Referring to FIG. 27, the transmitter 27060 according to one embodiment may include a color gamut resampling unit 27010, a signaling information generator 27020, an encoder for encoding the generated signaling information and content data based on the second color gamut, and/or a transmitter 27040 for transmitting the encoded content data and the encoded signaling information.

Respective components contained in the transmitter according to an embodiment of the present invention may perform respective steps of the method for transmitting the broadcast signal.

The color gamut resampling unit 27010 may resample the content data based on the first color gamut into content data based on the second color gamut. A detailed description thereof has already been given with reference to FIGS. 2 and 24.

The signaling information generator 27020 may generate signaling information including the color gamut resampling information for indicating the resampling information. A detailed description thereof has already been given with reference to FIGS. 6, 7, 8, 18, 19, 21, 22, and 23.

The encoder 27030 may encode the generated signaling information and content data based on the second color gamut. A detailed description thereof has already been given in FIG. 24.

The transmitter 27040 may transmit the encoded content data and the encoded signaling information. A detailed description thereof has already been given in FIG. 24.

Figure 28:
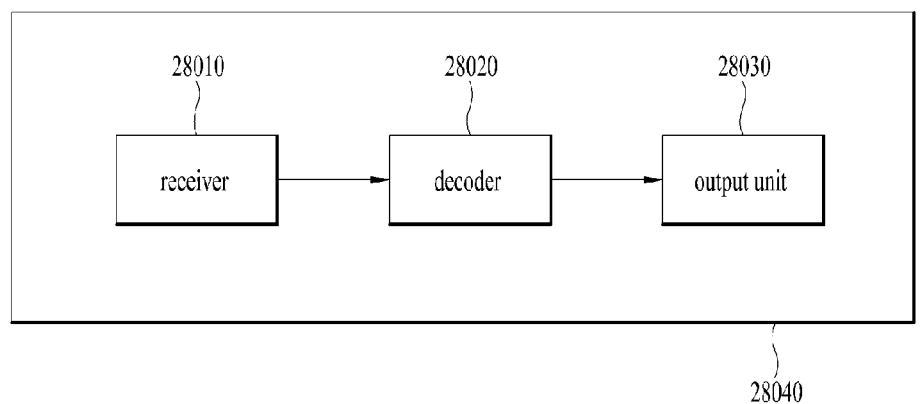
FIG. 28 is a block diagram illustrating an apparatus for receiving a broadcast signal according to an embodiment of the present invention.

FIG. 28 is a block diagram illustrating an apparatus for receiving a broadcast signal according to an embodiment of the present invention.

Referring to FIG. 28, the apparatus for receiving the broadcast signal may include a receiver 28010, a decoder 28020, and/or an output unit 28030.

Respective components contained in the receiving apparatus according to one embodiment may perform the respective steps of the method for receiving the broadcast signal.

The receiver 28010 may receive not only content data based on the first color gamut, but also signaling information including color gamut resampling information regarding the content data based on the first color gamut. A detailed description thereof has already been given with reference to FIGS. 2, 3, 4, 6, 7, and 25. The receiver 28010 according to one embodiment may include a tuner, a demodulator, a VSB decoder, and a demultiplexer (Demux).

The decoder 28020 may decode each of the received signaling information and content data based on the first color gamut. A detailed description thereof has already been given with reference to FIGS. 3, 4, 6, 7, and 25. The decoder 28020 according to one embodiment may include the above-mentioned section data processor and/or the decoder.

The output unit 28030 may resample the content data based on the decoded first color gamut into content data based on the second color gamut on the basis of the decoded signaling information, and may output the resampled result to the display based on the second color gamut or may output the content data based on the decoded first color gamut into the display based on the first color gamut. A detailed description thereof has already been given with reference to FIGS. 3, 4, and 25. The output unit 28030 according to one embodiment may include the above-mentioned gamut matching unit and/or gamut mapping unit.

Although the description of the present invention is explained with reference to each of the accompanying drawings for clarity, it is possible to design new embodiment(s) by merging the embodiments shown in the accompanying drawings with each other. And, if a recording medium readable by a computer, in which programs for executing the embodiments mentioned in the foregoing description are recorded, is designed in necessity of those skilled in the art, it may belong to the scope of the appended claims and their equivalents.

An apparatus and method according to the present invention may be non-limited by the configurations and methods of the embodiments mentioned in the foregoing description. And, the embodiments mentioned in the foregoing description can be configured in a manner of being selectively combined with one another entirely or in part to enable various modifications.

In addition, a method according to the present invention can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes can be saved and executed according to a distributive system.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

Mode for Invention

Various embodiments have been described in the best mode for carrying out the invention.

INDUSTRIAL APPLICABILITY

The embodiments of the present invention can be applied to the entire broadcasting industry.

The invention claimed is:

1. A method for transmitting a broadcast signal comprising:
resampling content data based on a first color gamut into content data based on a second color gamut;
generating signaling information including color gamut resampling information indicating information of the resampling,
wherein the color gamut resampling information includes content color gamut type information indicating a type of the first color gamut,
wherein the color gamut resampling information further includes content color primaries information for defining the first color gamut when the type of the first color gamut corresponds to an arbitrary color gamut according to the content color gamut type information,
wherein the content color primaries information includes coordinate values of reference colors in a color space, the coordinate values being used for defining the first color gamut;
encoding the generated signaling information and the content data based on the second color gamut; and
transmitting the encoded content data and the encoded signaling information.

2. The method according to claim 1, wherein the color gamut resampling information includes container color gamut type information indicating a type of the second color gamut, color gamut resampling type information indicating a scheme of the resampling, and detailed information of a color gamut resampling type based on the color gamut resampling type information.

3. The method according to claim 2,
wherein the color gamut resampling information further includes container color primaries information for defining the second color gamut when the type of the second color gamut corresponds to an arbitrary color gamut according to the container color gamut type information,
wherein the container color primaries information includes coordinate values of reference colors in a color space, the coordinate values being used for defining the second color gamut.

4. The method according to claim 2, wherein:
if the resampling scheme based on the color gamut resampling type information is a method for converting the content data based on the first color gamut into content data represented on a reference color space and converting the converted content data represented on the reference color space into the content data based on the second color gamut, the detailed information includes information indicating a type of the reference color space, coefficient information of a conversion equation for converting the content data based on the first color gamut into the content data represented on the reference color space, and coefficient information of a conversion equation for converting the converted content data represented on the reference color space into the content data based on the second color gamut,
wherein the reference color space indicates a neutral color space not affected by the first color gamut, the reference color space being different color space from a color space of the content data based on the first color gamut.

5. The method according to claim 2, wherein:
if the resampling scheme based on the color gamut resampling type information is a method for directly converting the content data based on the first color gamut into content data based on the second color gamut, the detailed information of the color gamut resampling type includes coefficient information of a conversion equation for converting content data based on the first color gamut into the content data based on the second color gamut; and
if the resampling scheme based on the color gamut resampling type information is a method for employing a lookup table indicating mapping information between the content data based on the first color gamut and the content data based on the second color gamut, the detailed information of the color gamut resampling type includes type information of the lookup table and constituent element information of the lookup table.

6. The method according to claim 1, wherein:
the signaling information includes a Program Map Table (PMT) message, an Event Information Table (EIT)

message, a Video Usability Information (VUI) message, and a Supplemental Enhancement Information (SEI) message; and at least one of the Program Map Table (PMT) and the Event Information Table (EIT) includes identification (ID) information for identifying that a broadcast service contained in the broadcast signal is a broadcast service based on the color gamut resampling.

7. The method according to claim 6, wherein the color gamut resampling information is contained in at least one of the Program Map Table (PMT) message, the Event Information Table (EIT) message, the Video Usability Information (VUI) message, and the Supplemental Enhancement Information (SEI) message.

8. A method for receiving a broadcast signal comprising:
receiving content data based on a first color gamut and signaling information including color gamut resampling information regarding the content data based on the first color gamut;
decoding each of the received signaling information and the content data based on the first color gamut; and
resampling the content data based on the first color gamut into content data based on a second color gamut using the signaling information, outputting the resampled data to a display based on the second color gamut or outputting the content data based on the first color gamut to a display based on the first color gamut,
wherein the color gamut resampling information includes content color gamut type information indicating a type of the second color gamut,
wherein the color gamut resampling information further includes content color primaries information for defining the second color gamut when the type of the second color gamut corresponds to an arbitrary color gamut according to the content color gamut type information,
wherein the content color primaries information includes coordinate values of reference colors in a color space, the coordinate values being used for defining the second color gamut.

9. The method according to claim 8, wherein the color gamut resampling information includes container color gamut type information indicating a type of the first color gamut, color gamut resampling type information indicating a scheme of the resampling, and detailed information of a color gamut resampling type based on the color gamut resampling type information.

10. The method according to claim 9,
wherein the color gamut resampling information further includes container color primaries information for defining the first color gamut when the type of the first color gamut corresponds to an arbitrary color gamut according to the container color gamut type information,
wherein the container color primaries information includes coordinate values of reference colors in a color space, the coordinate values being used for defining the first color gamut.

11. The method according to claim 9, wherein:
if the resampling scheme based on the color gamut resampling type information is a method for converting the content data based on the second color gamut into content data represented on a reference color space and converting the converted content data represented on the reference color space into the content data based on the first color gamut, the detailed information includes information indicating a type of the reference color space, coefficient information of a conversion equation for converting the content data based on the second color gamut into the content data represented on the reference color space, and coefficient information of a conversion equation for converting the converted content data represented on the reference color space into the content data based on the first color gamut,
wherein the reference color space indicates a neutral color space not affected by the second color gamut, the reference color space being different color space from a color space of the content data based on the second color gamut.

12. The method according to claim 9, wherein:
if the resampling scheme based on the color gamut resampling type information is a method for directly converting the content data based on the second color gamut into content data based on the first color gamut, the detailed information of the color gamut resampling type includes coefficient information of a conversion equation for converting content data based on the second color gamut into the content data based on the first color gamut; and
if the resampling scheme based on the color gamut resampling type information is a method for employing a lookup table indicating mapping information between the content data based on the second color gamut and the content data based on the first color gamut, the detailed information of the color gamut resampling type includes type information of the lookup table and constituent element information of the lookup table.

13. The method according to claim 8, wherein:
the signaling information includes a Program Map Table (PMT) message, an Event Information Table (EIT) message, a Video Usability Information (VUI) message, and a Supplemental Enhancement Information (SEI) message; and
at least one of the Program Map Table (PMT) and the Event Information Table (EIT) includes identification (ID) information for identifying that a broadcast service contained in the broadcast signal is a broadcast service based on the color gamut resampling.

14. The method according to claim 13, wherein the color gamut resampling information is contained in at least one of the Program Map Table (PMT) message, the Event Information Table (EIT) message, the Video Usability Information (VUI) message, and the Supplemental Enhancement Information (SEI) message.

15. An apparatus for transmitting a broadcast signal comprising:
a color gamut resampling unit configured to resample content data based on a first color gamut into content data based on a second color gamut;
a signaling information generator configured to generate signaling information including color gamut resampling information indicating information of the resampling,
wherein the color gamut resampling information includes content color gamut type information indicating a type of the first color gamut,
wherein the color gamut resampling information further includes content color primaries information for defining the first color gamut when the type of the first color gamut corresponds to an arbitrary color gamut according to the content color gamut type information,
wherein the content color primaries information includes coordinate values of reference colors in a color space, the coordinate values being used for defining the first color gamut;

an encoder configured to encode the generated signaling information and the content data based on the second color gamut; and a transmitter configured to transmit the encoded content data and the encoded signaling information.

16. An apparatus for receiving a broadcast signal comprising:

a receiver configured to receive content data based on a first color gamut and signaling information including color gamut resampling information regarding the content data based on the first color gamut;

a decoder configured to decode each of the received signaling information and the content data based on the first color gamut; and an output unit configured to resample the content data based on the first color gamut into content data based on a second color gamut using the signaling information, outputting the resampled data to a display based on the second color gamut or outputting the content data based on the first color gamut to a display based on the first color gamut, wherein the color gamut resampling information includes content color gamut type information indicating a type of the second color gamut, wherein the color gamut resampling information further includes content color primaries information for defining the second color gamut when the type of the second color gamut corresponds to an arbitrary color gamut according to the content color gamut type information, wherein the content color primaries information includes coordinate values of reference colors in a color space, the coordinate values being used for defining the second color gamut.

* * * * *